(12) United States Patent
Zhou

(10) Patent No.: US 10,728,656 B1
(45) Date of Patent: Jul. 28, 2020

(54) AUDIO DEVICE AND AUDIO PROCESSING METHOD

(71) Applicant: KIKAGO LIMITED, Hong Kong (HK)

(72) Inventor: Chao Zhou, Hong Kong (HK)

(73) Assignee: KIKAGO LIMITED, Hong Kong (HK)

( * ) Notice: Subject to any disclaimer, the term of this patent is extended or adjusted under 35 U.S.C. 154(b) by 0 days.

(21) Appl. No.: 16/241,942

(22) Filed: Jan. 7, 2019

(51) Int. Cl.
*H04R 5/04* (2006.01)
*H04R 5/027* (2006.01)
*G10L 15/08* (2006.01)
*H04R 3/00* (2006.01)
*G06F 3/16* (2006.01)

(52) U.S. Cl.
CPC ............ *H04R 3/005* (2013.01); *G06F 3/167* (2013.01); *G10L 15/08* (2013.01); *H04R 5/027* (2013.01); *H04R 5/04* (2013.01); *G10L 2015/088* (2013.01); *H04R 2420/07* (2013.01); *H04R 2420/09* (2013.01)

(58) Field of Classification Search
CPC .......... H04R 3/005; H04R 5/027; H04R 5/04; H04R 2420/07; H04R 2420/09; G06F 3/167; G10L 15/08; G10L 2015/088
USPC ...................................... 381/26, 77, 92, 380
See application file for complete search history.

(56) References Cited

U.S. PATENT DOCUMENTS

| | | | | |
|---|---|---|---|---|
| 2003/0081935 A1* | 5/2003 | Kirmuss | ................... | H04N 7/18 386/327 |
| 2009/0003619 A1* | 1/2009 | Solow | ....................... | H04R 1/30 381/77 |
| 2011/0075858 A1* | 3/2011 | Chihara | ................. | H04R 3/005 381/92 |
| 2012/0087512 A1* | 4/2012 | Said | ....................... | H04R 3/005 381/92 |
| 2015/0245127 A1* | 8/2015 | Shaffer | ................ | H04R 1/1025 381/380 |
| 2017/0295429 A1* | 10/2017 | Poletti | ..................... | H04R 5/027 |
| 2019/0042185 A1* | 2/2019 | Young | ..................... | G06F 3/167 |

* cited by examiner

*Primary Examiner* — Paul Kim
*Assistant Examiner* — Friedrich Fahnert
(74) *Attorney, Agent, or Firm* — Anova Law Group, PLLC

(57) ABSTRACT

The present disclosure provides an audio device and an audio processing method based on the charger cable. The audio device includes: at least two microphones configured to collect audio signals; and a microcontroller configured to, process the audio signals collected by the at least two microphones to generate one data stream; and when the audio device is connected to a computing terminal, send the data stream to the computing terminal, the data stream being further processed by the computing terminal to perform an action. Each of the at least two microphones is respectively connected to the microcontroller.

20 Claims, 10 Drawing Sheets

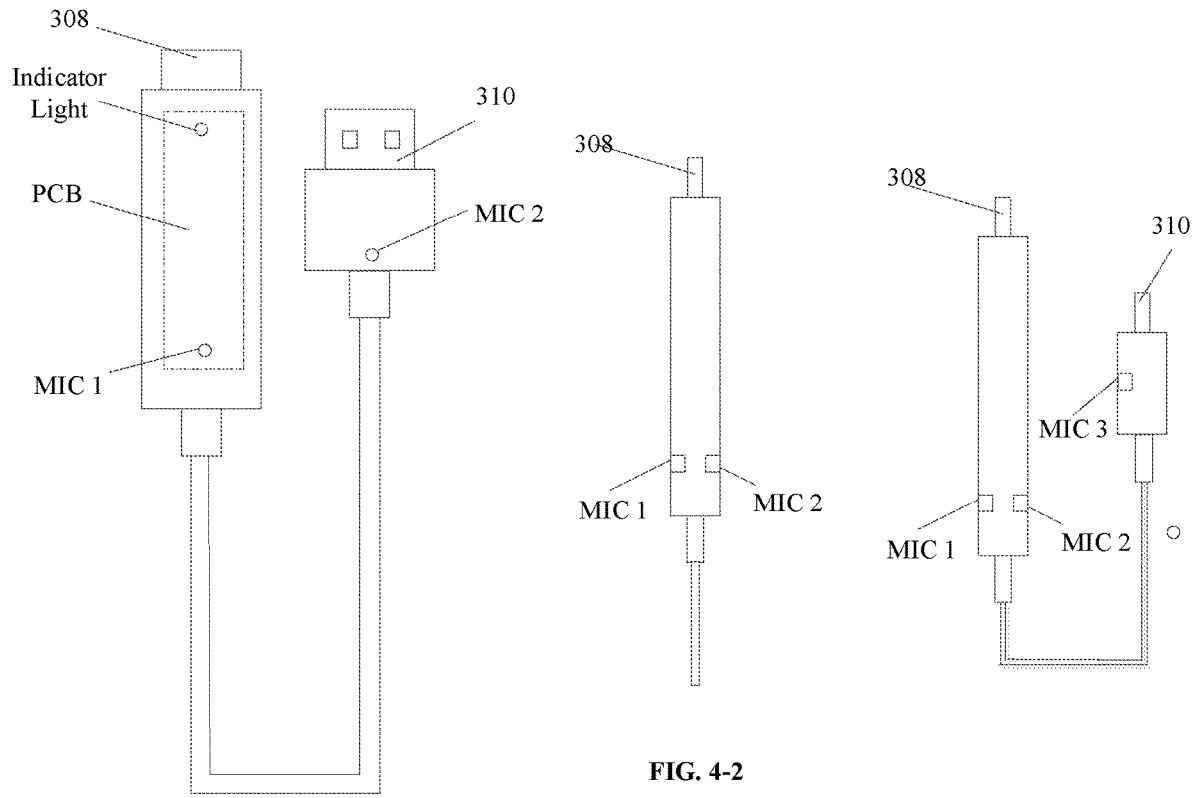
FIG. 4-1
FIG. 4-2
FIG. 4-3
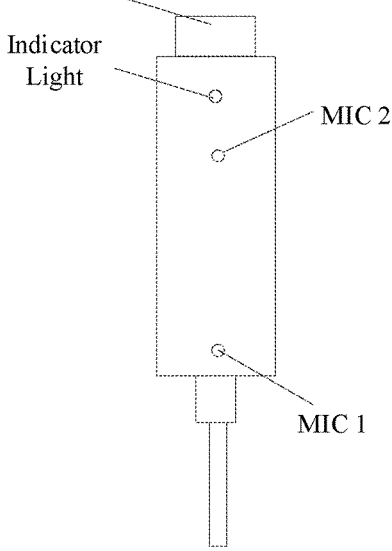
FIG. 4-4
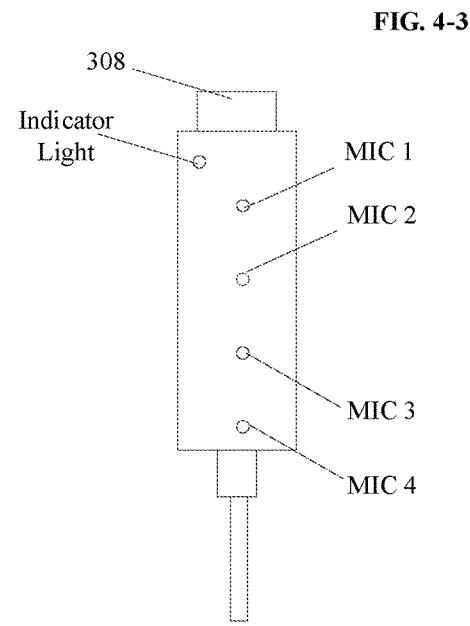
FIG. 4-5

AUDIO DEVICE AND AUDIO PROCESSING METHOD

FIELD OF THE DISCLOSURE

The present disclosure relates to the field of smart hardware technologies and, more particularly, relates to an audio device and an audio processing method based on the audio device.

BACKGROUND

Human-machine interaction during vehicle driving is an important technical issue. Today, portable electronic devices like mobile phones becomes more and more popular the gateway for this interaction by playing two distinct roles at a time: with the help of various navigation apps downloading on-line maps and real-time traffic data base, it acts as the navigation assistant for the driver while it remains the access point for the same driver to the IM apps where he/she communicates with the correspondents and receives notifications. A long existing problem for this usage is that interactions with the mobile phone attract the attention of the driver which need to be highly concentrated on road, and this conflict gets worse when the driver need to adjust the navigation destination/choice according to its communication on IM apps. As a result, most drivers have the need and/or experience of manually operating the mobile phone while driving or waiting for a green light, which poses great security risk. Although many countries have established laws that prohibit this type of behavior, due to its inherent needs, such behavior is very difficult to be completely avoided and sometimes can cause serious accidents.

On this issue, various were proposed to reduce or eliminate driver's manual operations on mobile phone, most of them consisting of providing voice control functionality instead. Existing solutions are mainly divided into two types. The first solution is to embed hardware that supports large-screen display and voice commands (such as big screen in a Tesla car) in a vehicle to reduce user's manual operation of the mobile phone. However, such configuration often cannot provide as many various functionalities and convenience as driver's own mobile phone does, which does not solve the fundamental problem. The second solution is to provide a stand-alone device that supporting voice recognition (for example, FEIYU in-car voice assistant manufactured by iFlytek) to allow voice control of some operations of the mobile phone or the car. Nevertheless, its cost remains considerable due to the necessity of embedded high-performance processor and/or communication module for the voice recognition, and a stand-alone device requires a dedicate power supply for itself, not always available in the vehicle.

Further, besides driving scenario, there are other occasions that users would like to control the mobile phone or devices by voice commands and/or to record human speakers' speech or conversation by processed audio file or by text generated by voice recognition, for example, when cooking in a kitchen, when both hands are tied up doing activities other than operating the phone, etc.

The disclosed method and system are directed to solve one or more problems set forth above and other problems.

BRIEF SUMMARY OF THE DISCLOSURE

One aspect of the present disclosure provides an audio device. The audio device includes: at least two microphones configured to collect audio signals and a microcontroller. Each of the at least two microphones is respectively connected to the microcontroller. The microcontroller is configured to process the audio signals collected by the at least two microphones to generate one data stream; and when the audio device is connected to a computing terminal, send the data stream to the computing terminal, the data stream being further processed by the computing terminal to perform an action.

Another aspect of the present disclosure provides an audio processing method. The method includes: connecting an audio device to a computing terminal, the audio device being integrated with at least two microphones; obtaining audio signals collected by the at least two microphones of the audio device; encoding, by the audio device, the audio signals to generate one data stream; and sending the data stream to the computing terminal, the data stream being decoded and processed by the computing terminal to perform an action.

Another aspect of the present disclosure provides an audio system. The audio system includes an audio device and a computing terminal. The audio device includes at least two microphones configured to collect audio signals and a microcontroller. Each of the at least two microphones is respectively connected to the microcontroller. The microcontroller is configured to process the audio signals collected by the at least two microphones to generate one data stream; and when the audio device is connected to the computing terminal, send the data stream to the computing terminal. The computing terminal is configured to decode the data stream and reconstruct the audio signals, perform one or more multi-input audio processing schemes to obtain one or more enhanced audio signal, and perform an action based on a result of voice recognition of the enhanced audio signal.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

FIG. 3-1 illustrates a block diagram of an exemplary audio device consistent with the disclosed embodiments;

FIG. 3-2 illustrates a circuit schematic diagram of an exemplary audio device consistent with the disclosed embodiments;

FIG. 4-1 illustrates a schematic front view of an exemplary charger cable consistent with the disclosed embodiments;

FIG. 4-2 illustrates a schematic profile view of another exemplary charger cable consistent with the disclosed embodiments;

FIG. 4-3 illustrates a schematic profile view of another exemplary charger cable consistent with the disclosed embodiments;

FIG. 4-4 illustrates a schematic front view of another exemplary charger cable consistent with the disclosed embodiments;

FIG. 4-5 illustrates a schematic front view of another exemplary charger cable consistent with the disclosed embodiments;

FIG. 5 illustrates a flow chart of an exemplary audio processing method consistent with the disclosed embodiments;

DETAILED DESCRIPTION

Figure 1:
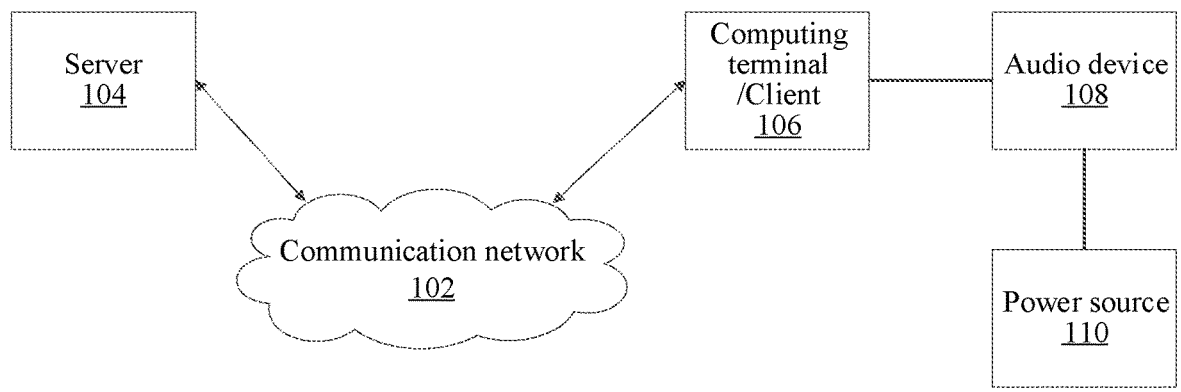
FIG. 1 illustrates an exemplary operating environment incorporating certain disclosed embodiments.

Reference will now be made in detail to exemplary embodiments of the invention, which are illustrated in the accompanying drawings. Hereinafter, embodiments consistent with the disclosure will be described with reference to the drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

The present disclosure provides an interactive solution that meets the following requirements: 1) full access of a mobile phone by voice control where a user does not need to manually operate the mobile phone, or even look at the mobile phone, and a desired operation can be completed (e.g., during driving), such as navigation, playing music, social communications, etc.; and 2) the cost is low enough while human-interaction needs based on voice recognition are fulfilled. In addition, the disclosed interactive solution also provides a convenient charging function, resolving potential issue of high power consumption during long-term operation of the mobile phone, in the form of a charging cable; and/or a fixation scheme for mobile phone in the vehicle (illustrative examples are presented in FIGS. 4-1 to 4-5 and 14), in the form of a phone holder used in vehicles.

Accordingly, the present disclosure provides a hardware device which facilitates full-voice/hand-free control of a computing terminal, i.e., an audio device, and an audio processing method based on the audio device. The disclosed device and method can achieve the following functions: 1) providing phone charging function; 2) supporting stable and clear collection of medium-field or far-field voice signal (e.g., in a car space); 3) supporting full-voice control of the computing terminal to complete the following operations: a) inputting, editing and sending texts by using voice, converting messages sent by friends into voice signals and playback the voice signal, supporting message reply/chat function on social applications; b) controlling a navigation software by voice for destination search, route selection, and navigation operations; c) launching a media application and playing music or other media by voice control; d) launching other applications that supports intent-based launching, and accomplishing functions identified by the intent; and 4) requiring low cost on hardware. In some embodiments, voice signal processing may be accomplished on the computing terminal, voice recognition and speech synthesis services may be implemented on a cloud server, and only extra hardware is an audio device integrated with multiple microphones.

The disclosed audio device includes multiple (at least two) microphones to collect audio signals and outputs a digital data stream based on the collected audio signals. Comparing to audio signals collected by a single microphone, many processing schemes can be applied to audio signals collected by multiple microphones to produce better audio/voice recognition performance, such as beam forming, AEC (Automatic Echo Cancellation), voice source tracing, identifying and separating source sound, far field noise reduction, source tracking, etc. A multi-input audio processing scheme, as used herein, may refer to a processing technique or algorithm for processing audio signals collected by multiple microphones.

The at least two microphones included in the disclosed audio device are located at predetermined positions on the audio device. In some embodiments, the geometric relationships among the microphones are mechanically fixed and can therefore be utilized in a multi-input audio processing scheme to determine characteristics of a sound source (e.g., orientation and distance between the microphones and the sound source) by evaluating a time difference of audio signals produced by the same sound source and received by different microphones. In this case, these microphones with fixed geometric relationships are commonly referred to as a lattice of microphones or a microphone array. In some embodiments, in addition to a microphone array or a single microphone dedicated to capture the voice signal, there are one or more extra microphones, with or without fixed geometric relationships with the other microphone(s) but facing toward a probable noise source to collect an audio source containing more noise than other microphone(s) (e.g., a microphone facing away or located further from the noise source). A multi-input audio processing scheme may include using the audio signals collected by these extra microphones as reference signals for reducing noises in audio signals collected by the microphone or microphone array dedicated to capture the voice signal.

Considering the speed of sound travel in the atmosphere (i.e., 340 m/s) and the spatial scale of the microphone array (e.g., the distance between two microphones in a microphone array may be in the centimeter range), the time difference of audio signals produced by the same sound source and received by different microphones are in the range of microseconds. That is, a multi-input audio processing scheme needs to be accurate enough to detect time differences in the range of microseconds. Accordingly, it can be understood that such multi-input audio processing schemes require high processing power and overhead.

Figure 10:
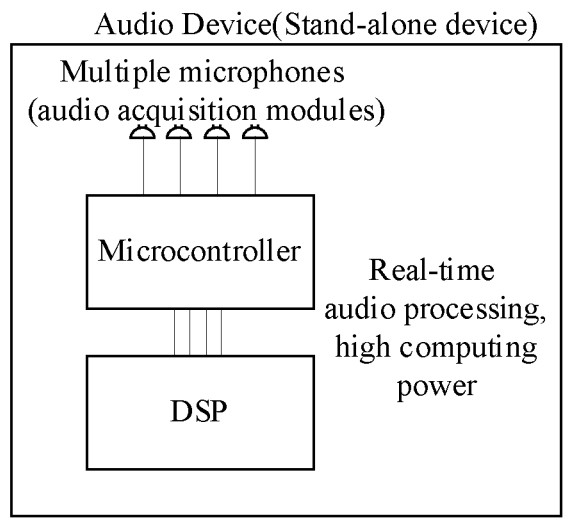
FIG. 10 illustrates a structural diagram of an audio device in the prior art.

In existing prevailing technologies, such as a smart speaker or a noise-cancelling headset, at least one microcontroller with high processing capabilities is embedded in the same device that hosts the microphone array. FIG. 10 illustrates a structural diagram of an audio device in the prior art. As shown in FIG. 10, in existing technologies, audio signals collected by any microphone can be received by the microcontroller chip without a communication delay above the range of microseconds. The microcontroller chip may connect to a digital signal processor (DSP) or other powerful CPU that is capable of locally using a multi-input audio processing scheme to process the audio signals collected by the multiple microphones. Such microcontroller either has rich computing power or needs to execute the multi-input audio processing scheme exclusively (e.g., one processing thread uses 100% of the computing power), which imposes a lower limit on hardware cost, power consumption, and heat generation. There have been many efforts in the field to reduce the hardware cost and power consumption while achieving same audio processing performances.

The disclosed audio device offers a solution to the problem of high hardware cost and high power consumption in existing technologies by transferring the local requirements of high computing power to a computing terminal connected to the audio device, so the audio device itself does not need to embed a microcontroller with high computing power. The disclosed audio device also provides a charging function which reduces unnecessary and complex accessories and wires.

Figure 11:
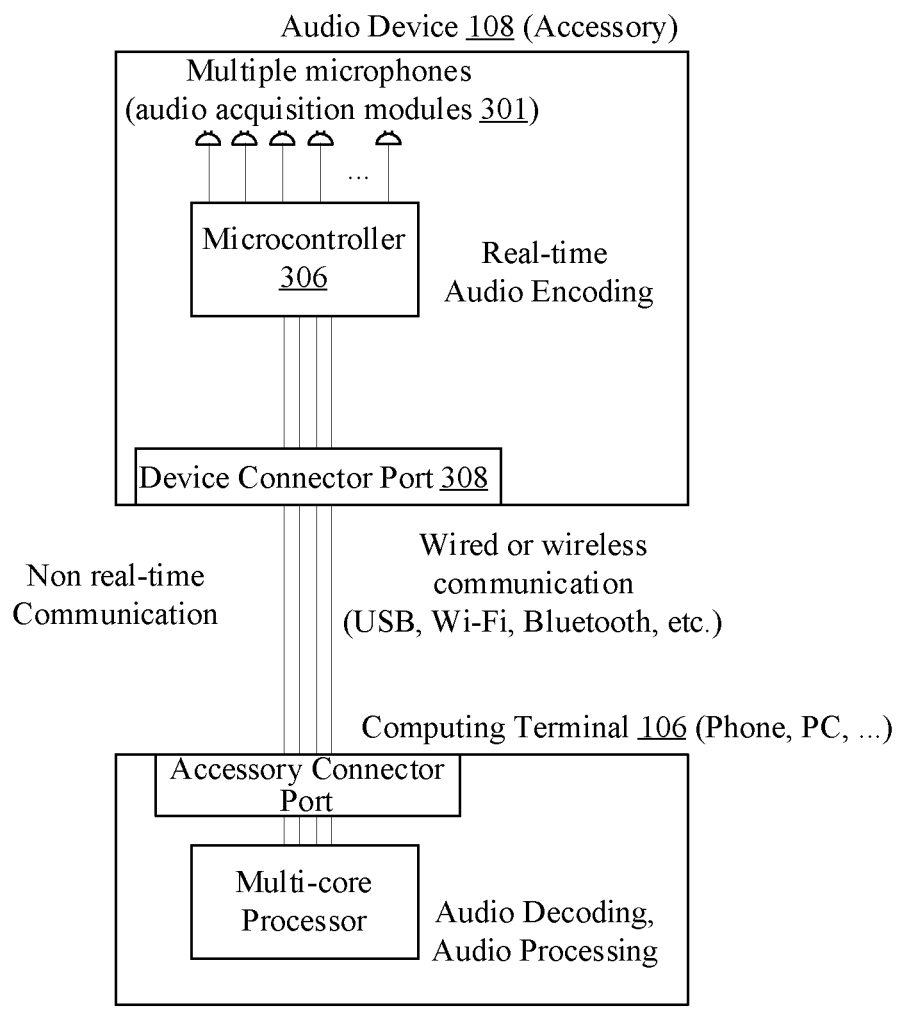
FIG. 11 illustrates a structural diagram of an exemplary audio device consistent with the disclosed embodiments.

FIG. 11 illustrates a structural diagram of an exemplary audio device consistent with the disclosed embodiments. As shown in FIG. 11, the local microcontroller in the disclosed audio device is configured to encode audio signals collected by the microphones. However, the entity that implements the multi-input audio processing scheme is not deployed locally in the audio device. The microcontroller of the audio device is configured to digitally encode the audio signals collected by the microphones to generate one data stream. The data stream that encodes the audio signals can be transmitted based on a communication protocol, real-time or not, to a computing terminal for further decoding and processing. The data stream can be processed by the computing terminal after certain communication delay from the time the audio signals were collected. The communication delay may be stable or unstable, and may be in the range of milliseconds, less than one second, or seconds. The data stream can be decoded and analyzed with one or more multi-input audio processing schemes on the computing terminal in real time or with a little delay. The data stream is also encoded in a specific way to ensure the data decoded by the computing terminal can provide accurate time difference information (i.e., the time difference of audio signals produced by the same sound source and received by different microphones) regardless of whether certain information is lost during the communication. Further, the disclosed audio device can also charge the computing terminal if connected to or embedded with a power source. The connection between the computing terminal and the audio device can be a wired connection or a wireless connection, such as a USB connection, a Wi-Fi connection, and/or a Bluetooth connection. When the connection is wired, the device connector port may include a physical interface to be connected or plugged into a compatible interface on the computing terminal. When the connection is wireless, the device connector port and/or the microcontroller may include a wireless communication circuit that supports one or more wireless data transfer protocol. In some embodiments, the device connector port and/or the microcontroller may support one or more wireless charging protocol.

The technical advantages of the disclosed audio device include, the need of a high-performance processor is eliminated, the requirement of exclusively occupying a processor in processing the collected audio signals is eliminated, and a stand-alone audio device with high costs and complex hardware can be turned into an accessory-level device. As consumer electronics represented by mobile phones, tablets and laptops are prevailing in nowadays, it is very easy to find a host computing terminal for such accessory-level audio device, without imposing extra hardware cost for end users, and deploy audio processing schemes on the computing terminal. Comparing to the processor deployed locally in a stand-alone audio device in the prior art, the computing power provided by the host computing terminal can be much higher and offer additional capabilities of executing more than one multi-input audio processing scheme on a same data stream in parallel. In some embodiments, the disclosed audio device may implement certain preprocessing scheme that do not consume high computing power, such as automatic gain control, amplification, and/or noise reduction on single source audio signal. FIG. 1 depicts an exemplary environment 100 incorporating the exemplary methods and computing terminals in accordance with various disclosed embodiments. As shown in FIG. 1, the environment 100 can include a computing terminal/client 106 and an audio device 108. When the audio device 108 connects the computing terminal 106 with the power source 110, the computing terminal 106 can be charged through the audio device 108. Further, the audio device 108 is integrated with at least two microphones and audio signals collected by the at least two microphones are transmitted to the computing terminal 106 through the audio device 108. In some embodiments, the audio device 108 may be a charger cable, a charger adapter, or a charging dock.

In some embodiments, the environment may further include a server 104 and a communication network 102. The server 104 and the computing terminal 106 may be coupled through the communication network 102 for information exchange, e.g., voice signal processing, voice signal generation, chatting in social applications, etc. Although only one computing terminal 106 and one server 104 are shown in the environment 100, any number of terminals 106 or servers 104 may be included, and other devices may also be included.

The communication network 102 may include any appropriate type of communication network for providing network connections to the server 104 and computing terminal 106 or among multiple servers 104 or computing terminals 106. For example, the communication network 102 may include the Internet or other types of computer networks or telecommunication networks, either wired or wireless.

A terminal, or a computing terminal, as used herein, may refer to any appropriate user terminal with certain computing capabilities, e.g., a personal computer (PC), a work station computer, a hand-held computing device (e.g., a tablet), a mobile terminal (e.g., a mobile phone or a smart phone), or any other user-side computing device.

A server, as used herein, may refer to one or more server computers configured to provide certain server functionalities, e.g., voice data analysis and recognition, network data storage, social network service maintenance, and database management. A server may also include one or more processors to execute computer programs in parallel.

Figure 2:
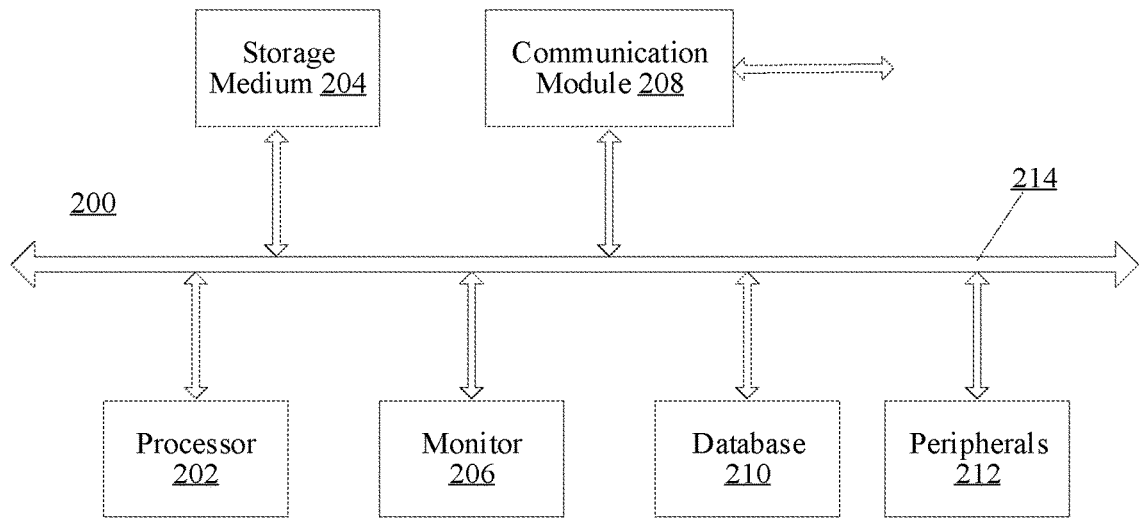
FIG. 2 illustrates a block diagram of an exemplary computer system consistent with the disclosed embodiments.

The server 104 and the computing terminal 106 may be implemented on any appropriate computing platform. FIG. 2 shows a block diagram of an exemplary computing system 200 capable of implementing the server 104 and/or the computing terminal 106. As shown in FIG. 2, the exemplary computer system 200 may include a processor 202, a storage medium 204, a monitor 206, a communication module 208, a database 210, peripherals 212, and one or more bus 214 to couple the devices together. Certain devices may be omitted and other devices may be included.

The processor 202 can include any appropriate processor or processors. Further, the processor 202 can include multiple cores for multi-thread or parallel processing. The storage medium 204 may include memory modules, e.g., Read-Only Memory (ROM), Random Access Memory (RAM), and flash memory modules, and mass storages, e.g., CD-ROM, U-disk, removable hard disk, etc. The storage medium 204 may store computer programs for implementing various processes (e.g., obtaining and processing voice signal, playing music, running navigation application, etc.), when executed by the processor 202.

The monitor 206 may include display devices for displaying contents in the computing system 200. The peripherals 212 may include I/O devices, such as keyboard and mouse for inputting information by a user, an audio output device for outputting information such as a speaker, charging port, USB port, etc. The peripherals may also include certain sensors, such as gravity sensors, acceleration sensors, and other types of sensors.

Further, the communication module 208 may include network devices for establishing connections through the communication network 102 or with other external devices through wired or wireless connection (e.g., Wi-Fi, Bluetooth, cellular network). The database 210 may include one or more databases for storing certain data and for performing certain operations on the stored data, e.g., voice signal processing based on stored reference signals, voice message synthesis based on stored templates, etc.

In operation, the computing terminal 106 can receive a data stream including audio signals from the audio device 108. The computing terminal 106 may be configured to provide structures and functions correspondingly for related actions and operations. More particularly, the computing terminal 106 may analyze the data stream from the audio device and implement related actions based on an analysis result of the audio signals (e.g., in accordance with communications with the server 104).

Figures 1, 3:
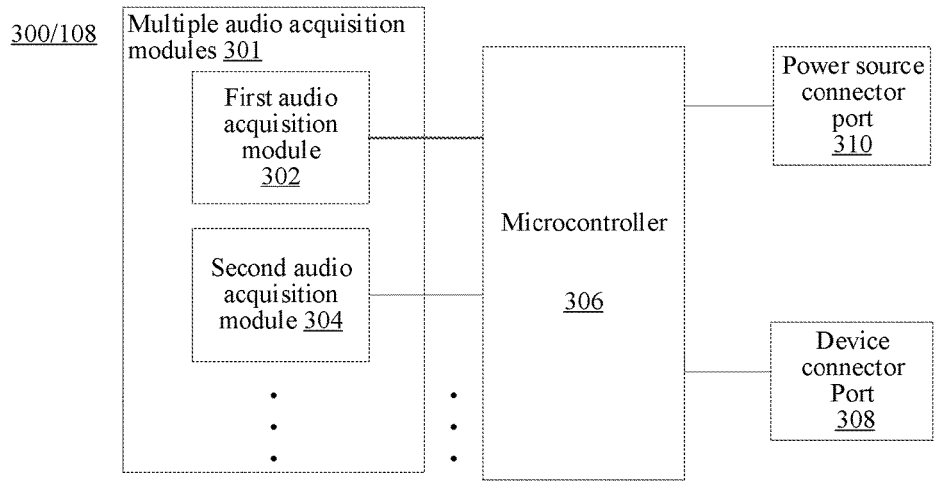
Figures 2, 3:
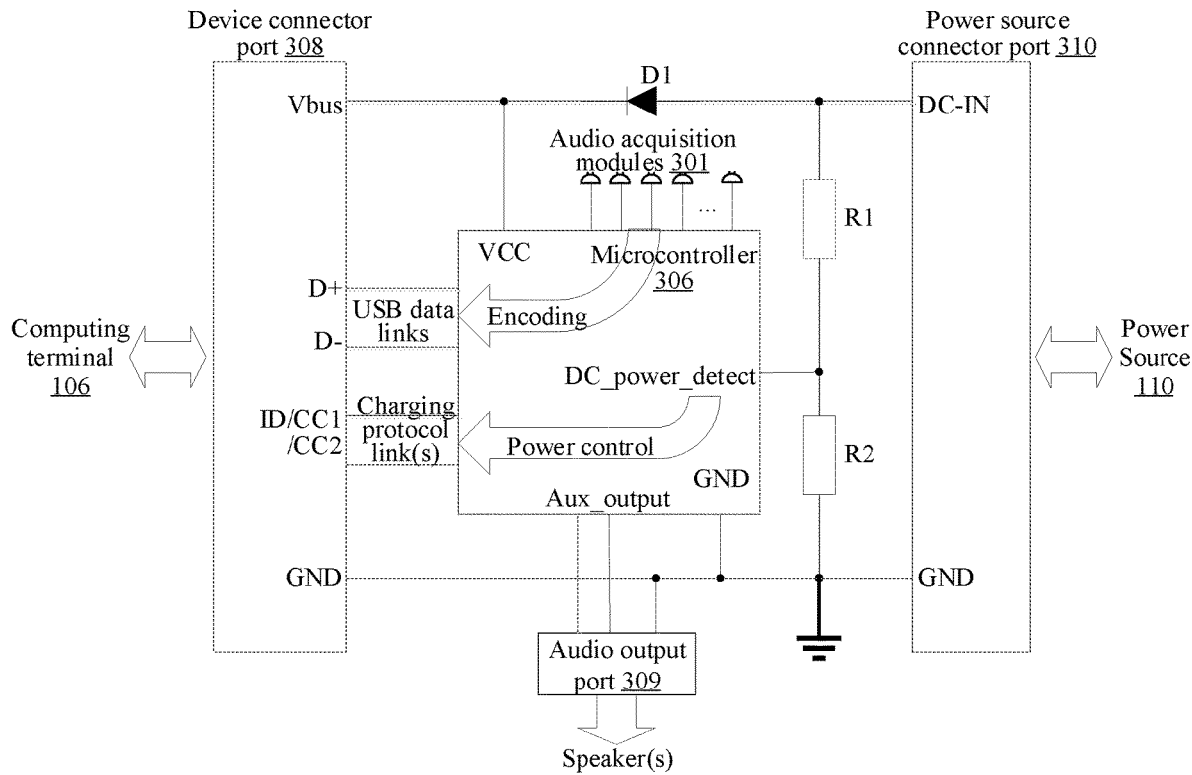

FIG. 3-1 illustrates a block diagram of an exemplary audio device consistent with the disclosed embodiments. As shown in FIG. 3-1, an exemplary audio device 300 includes: a plurality of audio acquisition modules 301, a microcontroller 306, a device connector port 308, and a power source connector port 310. The audio device 300 may be the audio device 108 from the exemplary environment 100. The exemplary audio device may also be the audio device shown in FIG. 11. In an exemplary embodiment, the audio device 300 supports Universal Serial Bus (USB) connection. For example, the audio device 300 may be a USB charger cable, a USB charger adapter, or a USB charging dock. The audio device 300 may support one or more USB versions, such as USB 2.0, USB 3.0, USB 3.1, etc.

The device connector port 308 is an interface for connecting the audio device 108 and the computing terminal 106. The device connector port 308 can be any type of interface compatible with the computing terminal 106, such as type-B plug, Mini-B plug, Micro-B plug, Type-B SuperSpeed plug, Type-C plug, lightning connector, etc. In some embodiments, the device connector port 308 may support wired connection with the computing terminal 106. The microcontroller 306 may send or receive data from the computing terminal 106 through the device connector port 308 based on a standard wired data transfer protocol (e.g., USB data transfer protocol). In some embodiments, the device connector port 308 may support wireless communication with the computing terminal 106. For example, the device connector port 308 may include wireless communication circuit supporting a standard wireless communication protocol, such as Wi-Fi communication or Bluetooth communication.

The power source connector port 310 is an interface for connecting the audio device 108 and the power source 110. The power source connector port 310 can be any type of interface compatible with the power source 110, such as cigarette lighter plug, type-A plug, Mini-A plug Micro-A plug, Type-C plug, etc. In some embodiments, the power source 110 may be a component embedded in the audio device 300 (e.g., a rechargeable battery or a power bank) or an external power source electrically connected to the audio device 300. In some embodiments, the power source connector port 310 may support wired connection between the audio device and the power source 110. The audio device 300 may be charged by the power source 110 through the wired connection based on a standard charging protocol, such as USB charging protocol. Further, the audio device 300 (e.g., the microcontroller 306) allows the computing terminal 106 to be charged by the power source 110 through the audio device (e.g., through the power source connector port 310 and the device connector port 308). In some embodiments, the power source connector port 310 may support wireless communication with the power source 110. For example, the power source connector port 310 may include wireless communication circuit supporting a standard wireless charging protocol.

Further, the device connector port 308 and the power source connector port 310 of a same audio device 300 are compatible with each other, and they include matching pins for delivering power and data, each pair of matching pins are connected by internal wire directly or indirectly through the microcontroller 306.

When the device connector port 308 is connected to the computing terminal 106, and the power source connector port 310 is connected to the power source 110, the audio device 300 is configured to deliver power from the power source 110 to the computing terminal 106, i.e., charging the computing terminal 106. In some embodiments, the audio device 300 may include one or more wires configured to connect the power source connector port 310 with the device connector port 308 directly or indirectly through the microcontroller 306. When a charging current from the power source 110 is received through the power source connector port 310, the audio device can deliver the charging current to the computing terminal 106 through the device connector port 308 (e.g., through the wires and/or based on control signal from the microcontroller 306). In some embodiments, the power source connector port 310, the microcontroller 306, and the device connector port 308 may be configured to support wireless charging schemes to facilitate the computing terminal 106 to be charged by the power source 110 wirelessly. Further, the multiple audio acquisition modules 301 are powered by the power source 110. In some embodiments, the device connector port 308 may be plugged to an adapter, and connected to the computing terminal 106 through the adapter. In some embodiments, when the device connector port is connected to the computing terminal 106, and the power source connector port 310 is not connected to the power source 110, the multiple audio acquisition modules 301 and the microcontroller 306 can be powered by the computing terminal 106.

The multiple audio acquisition modules 301 are configured to collect audio signals from surrounding environment, and send the collected audio signals to the microcontroller 306. The multiple audio acquisition modules may include, as shown in FIG. 3-1, a first audio acquisition module 302 and the second audio acquisition module 304. Although two audio acquisition modules are shown, the number of total audio acquisition modules are not limited. Each audio acquisition module includes one microphone, such as an analog microphone and/or a digital microphone. In some embodiments, the audio acquisition module may further include an amplifier, and/or an analog-to-digital converter (ADC). Alternatively, the amplifier and/or the ADC may be included in the microcontroller 306. In some embodiments, one or more of the multiple audio acquisition module 301 may be a micro-electro-mechanical systems (MEMS) microphone. In some embodiments, some or all components of the audio acquisition modules 301 may be integrated in a same printed circuit board (PCB) as the microcontroller 306. Alternatively, one or more of the multiple audio acquisition modules 301 may be configured at a location different from the microcontroller 306, and connected to the microcontroller 306 by wire.

The microcontroller 306 is configured to receive the audio signals from all audio acquisition modules 301 included in the audio device (e.g., the first audio acquisition module 302 and the second audio acquisition module 304), process the collected audio signals to generate a data stream, and transmit the data stream to the computing terminal 106 (e.g., through the device connector port 308), such that the computing terminal 106 performs a corresponding action based on the data stream.

In some embodiments, the microcontroller is a codec chip capable of accepting multiple channels of analog signals and performing digital sampling of the input signals at the multiple channels in parallel. The digital sampling may include analog-digital-conversion for analog signals and/or pulse-density modulation (PDM). Each microphone (i.e., each audio acquisition module) is equipped with a separate sampling port that operates independently and in parallel with other sampling port(s). The digital sampling rate for each microphone is the same. That is, each microphone is connected to the same single microcontroller 306 at a corresponding sampling port, and the microcontroller 306 is configured to sample the audio signal from each microphone using a same clock signal at a same rate. For example, when the sampling rate is 16 kHZ and the audio device includes four microphones in total, the microcontroller 306 can obtain four digital data points at each sampling period (e.g., 1/16 millisecond).

In some embodiments, the microcontroller 306 is configured to encode the sampled data from at least two microphones in an alternate manner to generate the data stream. Specifically, assuming the total number of microphones included in the audio device is denoted as n, immediately after encoding the audio data sampled from the ith microphone during m consecutive sampling periods (i.e., m data points), the audio data sampled from the (i+1)th microphone from the same m consecutive sampling periods are encoded, where i is an integer ranging from 1 to n−1, and m is a positive integer, such as 3. Further, immediately after encoding the audio data sampled from the nth microphone (i.e., when i equals n), the audio data sampled from the first microphone from the next m consecutive sampling periods are encoded. For example, the audio device includes 4 microphones (i.e., n=4) and the encoding scheme is alternatively encoding sampled datapoints from the 4 microphones at every 3 consecutive sampling periods (i.e., m=3). The sampled data points from the 4 microphones at any sampling period may be denoted as At, Bt, Ct, and Dt, where t is a sequence number of the sampling period. The encoded data stream may include: A0A1A2B0B1B2C0C1C2D0D1D 2A3A4A5B3B4B5C3C4C5D3D4D5A6A7A8B6B7B8 . . . . In another example, if the consecutive sampling period is 1 (i.e., m=1), the encoded data stream may include: A0B0C0D0A1B1C1D1A2B2C2D2A3B3C3D3A4B4C4 D4 . . . .

In addition, the specific encoding format for each datapoint (e.g., A0 or B0) is not limited. Each datapoint may be an 8-bit data, a 16-bit data, or have other fixed bit size like PCM (pulse-code modulation) data. In some embodiments, the microcontroller 306 may compress multiple datapoints into one data capsule using a compressing scheme. For example, the audio device includes 4 microphones and the encoding scheme is alternatively encoding sampled datapoints from the 4 microphones at every 3 consecutive sampling periods. Each capsule may include three consecutive sampled data from one microphone, such as A0A1A2 or B0B1B2. The capsules can be compressed using any compressing scheme suitable for the corresponding data points. The compressing scheme for different capsules are not necessarily the same. The capsule that compressed A0A1A2 may have a size different from the size of the capsule that compressed B0B1B2. Capsules are further encoded to the data stream using a similar interleaved manner. A specific marker may be added at the beginning and/or the end of each capsule to separate datapoints in a same capsule with others in the encoded data stream. For example, a comma can be added at the end of each capsule. The encoded data stream may include: A0A1A2, B0B1B2, C0C1C2, D0D1D2, A3A4A5, B3B4B5, C3C4C5, D3D4D5 . . . .

In some embodiments, audio signals collected by all microphones are synchronously sampled at corresponding sampling ports/interfaces in the same codec based on a same clock signal of a fixed frequency. The sampled digital data are strictly encoded in the above-described alternative/interleaved manner according to the sampling periods. Such configuration can ensure that the encoded data stream can be decoded to restore precise alignment of the multiple channels of audio signals based on their sampling time sequences, even when there is a communication delay or packet loss during the communication. The accuracy can reach the range of microseconds. Such level of precision and accuracy enables the computing terminal 106 to implement one or more multi-input audio processing schemes, such as determining characteristics (e.g., orientation and/or distance) of sound source(s), enhancing signals from desired sound source based on the characteristics, reducing signals from noise source based on the characteristics, etc.

The advantage of the disclosed encoding scheme includes, the data stream can be packetized for asynchronous communication (such as USB data transfer). When communication congestion, delay, or even sporadic packet loss occurs, the decoded data stream can still restore precise alignment of the multiple channels of audio signals based on their sampling time sequences, and the performance of the multi-input audio processing scheme is not significantly affected. Using the previous encoding example, an encoded data stream includes: A0B0C0D0A1B1C1D1A2B2C2D 2A3B3C3D3A4B4C4D4. The encoded data stream may be packaged into data packets in the unit of datapoints corresponding to same sampling period. That is, for four microphones, At, Bt, Ct, and Dt are considered as one unit. Each data packet may include two units of datapoints. Assuming data packet describing the two units of A2B2C2D2A3B3C3D3 is lost during communication, the decoded data stream can still align the four channels using the remaining data packets: A0B0C0D0A1B1C1D1A4B4C4D4 without affecting the relative time sequences among different data packets. If the sampled audio signals were separately transmitted and not encoded in the disclosed interleaved encoding scheme, the computing terminal 106 would not be able to restore the precise alignment of the audio datapoints according to their sampling time sequence.

In some embodiments, the data stream may include digitalized signals converted/encoded by the microcontroller 306 directly from the collected audios signals. For example, the microcontroller 306 may be configured to generate the data stream by encoding each of the audio signals collected by each audio acquisition module using a specific encoding strategy to preserve the information about the specific microphone that collected each audio data point and to ensure audio data points collected at the same time by different microphones can be accurately recreated without breaking or mismatching the original time sequences of audio signals collected by different microphones. The computing terminal 106 can, based on the data stream, reconstruct the audio signals collected by different microphones in a synchronous time frame.

In some embodiments, the microcontroller 306 may be configured to perform a preset signal processing scheme on the audio signals from the audio acquisition modules to produce a processed signal, and encode the processed signal into the data stream. For example, the microcontroller 306 may use a differential amplifier or other preprocessing techniques to process the audio signals from the audio acquisition modules 302 and 304 to generate the data stream. For example, first audio signals collected by the first audio acquisition module 302 mainly includes human voice in a surrounding environment, second audio signals collected by the second audio acquisition module 304 mainly includes background sound in the surrounding environment. That is, the microcontroller 306 may be configured to subtract the second audio signals from the first audio signals, so that meaningful voice signals can be amplified and more distinguishable. The data stream generated by the microcontroller 306 may include the subtracted and amplified signal. Accordingly, the computing terminal 106 may analyze the data stream and perform a corresponding action. Other preprocessing techniques that does not consume too much computing power or does not require exclusive processing can also be implemented, such as automatic gain control or signal amplification.

In some embodiments, the microcontroller 306 is configured to send the data stream to the computing terminal 106 using a USB data transfer protocol. The audio device 300 may be configured to support both standard USB data transfer protocol and standard USB charging scheme. In some embodiments, the microcontroller 306 may be a digital signal processor (DSP) and/or an audio codec chip.

In some embodiments, when the audio device is connected to the power source, a power of the first microphone (first audio acquisition module 302), a power of the second microphone (second audio acquisition module 306), and a power of the microcontroller 306 are provided by the power source; and when the audio device is connected to the computing terminal and is disconnected from the power source, the powers of the first microphone, the second microphone, and the microcontroller are provided by the computing terminal (e.g., computing terminal 106).

In some embodiments, the audio device 300 may further include one or more indicator light, configured to suggest a current state of the audio device 300 (e.g., by emitting different colors of light). The state of the audio device 300 can be one or more of: powered by the power source 110, powered by the computing terminal 106, and currently collecting audio signal.

FIG. 3-2 illustrates a circuit schematic diagram of an exemplary audio device that supports USB connection. It can be understood that USB connection is an illustrative example of the audio device shown in FIG. 3-1 of the present disclosure. Any other proper wired or wireless communication protocol can be implemented with same principles, as long as the communication protocol and corresponding hardware interface satisfy a preset bandwidth lower limit and does not expect to have regular transmission congestion, such as serial port connection protocol, I2S (Inter-IC Sound) protocol, SPI (Serial Peripheral Interface), Bluetooth Low Energy communication protocol, etc.

As shown in FIG. 3-2, the device connector port 308 may be connected to (e.g., plugged into) a compatible USB port of a computing terminal (e.g., a smart phone, a laptop, a tablet). The microcontroller 306 is connected to all audio acquisition modules and encodes audio signals from the audio acquisition modules to generate a data stream. The data stream is transmitted to the computing terminal through the USB data link pins in the device connector port 308, such as D+ pin and D− pin.

The microcontroller 306 includes a direct current (DC) power detection pin configured to evaluate the availability of power source (e.g., based on sampled voltage signal at this pin). Specifically, the Vbus pin of the device connector port 308 is connected to the DC input pin of the power source connector port 310 through a diode D1. The cathode of the diode D1 is connected to the Vbus pin of the device connector port 308, and the anode of the diode D1 is connected to the DC input pin of the power source connector port 310. Vcc pin of the microcontroller 306 is directly connected to the Vbus pin of the device connector port 308. The DC input pin is connected to a first terminal of a first resistor R1. A second terminal of the first resistor R1 is connected to the DC power detection pin of the microcontroller 306, and is also connected to a first terminal of a second resistor R2. A second terminal of the second resistor R2, and the ground pins of the microcontroller 306, the device connector port 308, and the power source connector 310 are all connected to the ground. The audio device may be charged by either the power source 110 through the power source connector port 310 or the computing terminal through the device connector port 308. The actual charging mode of the audio device is determined by the microcontroller 306 based on the sampled voltage signal at the DC power detection pin. From the perspective of the computing terminal 106, the computing terminal 106 can either charge the audio device using its own power or receive charging current transferred by the audio device from the power source 110. The charging mode of the computing terminal 106 can be adjusted or controlled based on signals communicated at the standard charging protocol link pin(s) of the device connector port 308. The standard charging protocol link pin(s) may be different based on different USB types, such as ID pin, CC1 pin and CC2 pin, etc. The device connector port 308 may include one or more charging protocol link pin(s) depending on the supported USB connection type.

In operation, when the power source 110 is connected to the power source connector port 310, the voltage sampled at the DC power detection pin is high. Based on the high-level voltage signal, the microcontroller 306 can determine that the power source is available, communicate with the computing terminal 106 through the charging protocol link pin(s), and allow the charging current from the power source 110 to be delivered to the computing terminal 106 through the Vbus pin of the device connector port 308. Further, the power supply of components in the audio device 300 is provided by the power source 110. The diode D1 can prevent reverse current from the computing terminal to the audio device when the power source 110 is supplying power. When the power source 110 is not connected to the power source connector port 310, the voltage sampled at the DC power detection pin is low. Based on the low-level voltage signal, the microcontroller 306 can determine that the power source is unavailable, communicate with the computing terminal 106 through the charging protocol link pin(s) and facilitate the computing terminal 106 to provide power supply to the entire audio device through the Vbus pin of the device connector port 308.

The technical advantage of such configuration can include: the accessory audio device 300 and the computing terminal 106 can be considered as one whole entity from the power supply perspective. When external power source is unavailable, they both consume the battery power of the computing terminal 106, and when the external power source is available, they are both charged. That is, the two devices (i.e., the computing terminal 106 and the audio device 300) only occupies a single power supply port/interface from the external power source. This provides convenience for users, especially in scenarios where the total number of power supply ports are limited, such as in a car.

In some embodiments, the audio device 300 may further include an optional audio output port 309. The audio output port 309 may be a standard audio socket compatible with a standard audio cable such as 3.5 mm cable so that the audio device 300 can be connected to an audio output device (e.g., one or more embedded or external speaker) through the audio cable and the audio output port 309. Alternatively, the audio output port 309 may include an audio cable with a standard audio jack connector that can be directly plugged into an auxiliary input of the external audio output device (e.g., external speaker). The microcontroller 306 may optionally include one or more auxiliary output pins connected to the audio output port 309 (e.g., two pins for the left channel and right channel). When the audio device 300 is connected to the computing terminal 106, and when the audio output device is connected to the audio output port 309, the microcontroller 306 is configured to receive the audio data transmitted from the computing terminal 106 through the device connector port 308 (e.g., at the D+ and D− pins) and send the audio data to the external speaker(s) through the audio output port 309. In some embodiments, the audio output port 309 is physically located at a same end as the power source connector port 310. Such configuration is useful for smart phones without audio jack but still needs to be charged and connected to an external audio output device at the same time. Such configuration is also particularly useful for the audio device used in car or in conference call. Both application scenarios require that the audio output from the computing terminal 106 to be played in volume big enough to be heard by human user(s). Without the above configuration, the native louder speaker(s) embedded in the computing terminal 106 are to play sounds, and these sounds would interfere with the audio signals collected by the multiple microphones 301. As the audio device 108 is often plugged into the computing terminal 106 as an accessory or a dock, some of the multiples microphones of the former could be physically close to the louder speaker(s) of the later. By consequence, some of these microphones could be seriously interfered or even saturated by the audio played by the louder-speaker(s) of the computing terminal 106. By directing the to-be-played contents to an audio output device such as external speaker(s), such as those in the car sound system, the problems of interference and saturation mentioned above could be resolved and the audio signals from the desired audio output device can be better distinguished. Because the audio output from the computing terminal 106, played from the external audio output device and coming from all surrounding angles to the audio device 108, are to be attenuated/suppressed or removed as ambient noise by a multi-input audio processing scheme.

Figure 5:
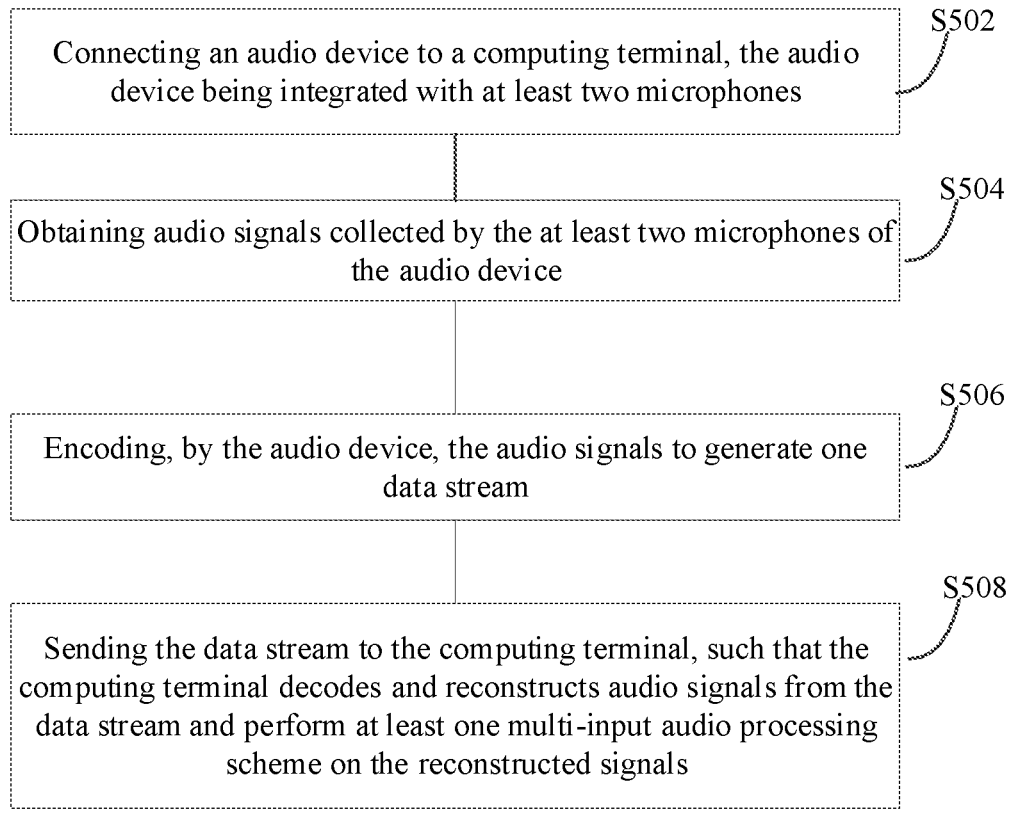

FIGS. 4-1 to 4-5 illustrates schematic views of exemplary charger cables consistent with the disclosed embodiments. As shown in FIGS. 4-1 to 4-5, the disclosed audio device 300 may be a charger cable that appears to be substantially the same as a standard USB charger cable. The charger cable may include a first end for connecting to the computing terminal 106 (e.g., through the device connector port 308) and a second end for connecting to the power source 108 (e.g., through the power source connector port 310). In some embodiments, a PCB housing the microcontroller 306 may be configured at the first end of the charger cable. Alternatively, the PCB may be configured at the second end of the charger cable.

Further, the multiple audio acquisition modules 301, such as the first audio acquisition module 302 and the second acquisition module 304 are configured at different locations on the charger cable. In one example, as shown in FIG. 4-1, the first audio acquisition module 302 (i.e., first microphone) is located near the device connector port 308 at the first end of the charger cable which is closer to the computing terminal 106, and the second audio acquisition module 304 (i.e., second microphone) is located near the power source connector port 310 at the second end of the charger cable which is closer to the power source 110. In some embodiments, the audio signal from the first microphone may be considered as from a desired sound source (e.g., voice signal from user of the computing terminal 106) and enhanced for further analysis, and the audio signal from the second microphone may be considered as used as from ambient environment and used as a reference signal for reducing noise in the audio signal from the first microphone. In another example, as shown in a profile view in FIG. 4-2, the first audio acquisition module 302 is facing a front side of the first end of the charger cable, and the second audio acquisition module 304 is facing a back side of the first end of the charger cable. Further, a microphone opening corresponding to the first audio acquisition module 302 and a microphone opening corresponding to the second audio acquisition module 304 may be arranged at symmetric locations. Alternatively, the two microphone openings may be arranged at non-symmetric locations at the first end. The two microphones forms a microphone array and audio signals from the two microphones can be used by the computing terminal 106 for further processing. In another example, as shown in a profile view in FIG. 4-3, beside the two microphones configured at opposite sides of the first end of the charger cable (e.g., near the device connector port 308), a third microphone is located at a front side of the second end of the charger cable (e.g., near the power source connector port 310). Due to the cable structure, the third microphone does not have a fixed geometric relationship with the first and second microphones. In some embodiments, the audio signal from the first and second microphones (i.e., a microphone array) may be considered as from a desired sound source (e.g., voice signal from human speaker(s) near the computing terminal 106) and enhanced for further analysis, and the audio signal from the third microphone may be considered as used as from ambient environment and used as a reference signal for reducing noise in the audio signal from the first microphone. In another example, as shown in a front view in FIG. 4-4, both the first audio acquisition module 302 and the second audio acquisition module 304 are located on the front side of the charger cable on the device connector port 308. It can be understood that, both the first audio acquisition module 302 and the second audio acquisition module 304 may be located on a same side of the charger cable on the power source connector port 310. In another example, as shown in a front view in FIG. 4-5, four microphones may be arranged at the same front side at a same end of the charger cable. The four microphones may be arranged to locate on a same vertical axis and with even spacings.

Figure 14:
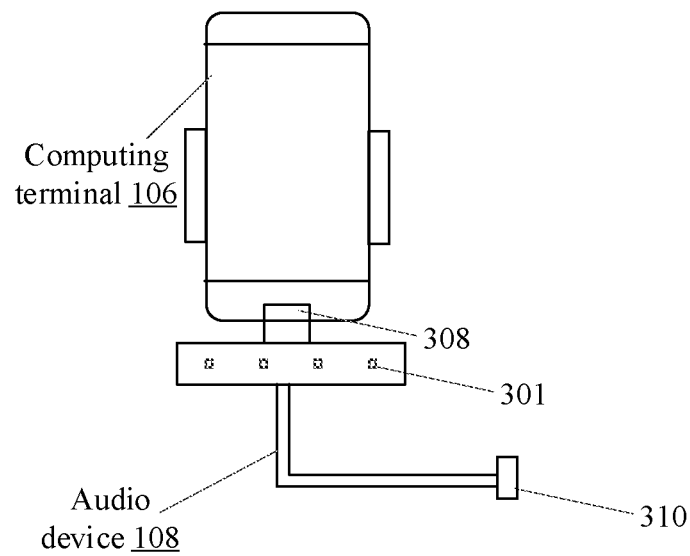
FIG. 14 illustrate a schematic view of an exemplary phone holder consistent with the disclosed embodiments.

In another embodiment, the disclosed audio device (e.g., a charger cable) may be used in accordance with a mounting structure (e.g., a car mount for a mobile phone or a phone holder). For example, FIG. 14 illustrate a schematic view of an exemplary phone holder consistent with the disclosed embodiments. A microphone array may be embedded in the mounting structure as shown in FIG. 14, while an extra microphone is embedded at another end of the audio device's power source connector 310 which connects to a USB receptacle or a car cigarette lighter socket (e.g., via an adapter). In this way, the microphone array can provide sufficient multi-input audio sources for the computing terminal to trace and enhance human voice, eventually from far-field, and the extra microphone can pick up background sound. Such configuration can support hands-free operation of the mobile phone through voice control. Further, the audio device supports standard USB data transfer protocol, which can deliver both charging power/current and audio data from the microphones to the mobile phone. Further, a power adapter may be plugged into the car cigarette lighter or a wall outlet, and convert input voltage to standard voltage for USB communication (e.g., 5V). The mobile phone together with the mounting structure may be placed at any desired location for collecting voice input from a user, such as a console panel of a car, a kitchen table, a working desk, etc.

Based on the disclosed hardware devices, when a user is speaking near the computing terminal 106, the user's voice and background sound are collected and transmitted to the terminal via the disclosed audio device. The computing terminal 106 can implement far-field voice signal processing technology to process the audio signals, removing noise and restoring a clear voice signal of the user. The computing terminal 106 can further analyze the voice signal of the user and using voice wake-up technology to confirm whether it is a voice instruction for performing an operation on the computing terminal 106. If it is confirmed that the voice signal is a voice instruction, the computing terminal 106 may perform real-time voice recognition on subsequently collected voice signals to determine an intent of the user. When it is recognized the user intends to input a text, the voice recognition technology is used to convert the voice signal into the text content, and perform, for example, a corresponding sending operation when the user is chatting through a messaging application or a social network service (SNS) application. When it is recognized that the intent of the user is a higher-level Intent, natural language processing technology can be used to recognize the intent, and invokes a corresponding application to execute an intended operation (for example, navigation, playing music, etc.).

As previously explained, locations of the microphones (e.g., positional relationships between different microphones, positional relationship between microphones and a sound source such as a human speaker) can affect actual time stamps of a same audio content produced by the same sound source and received by different microphones. For example, a microphone located closer to the sound source may receive the same audio content slightly earlier than a microphone located further away, and thereby creates a time difference. Many multi-input audio processing schemes are utilizing such time difference to locate the sound source, enhance the desired audio content, and/or reduce unwanted audio content such as noise.

In the application of the multi-input audio processing schemes based on microphone array, the axis that connects sound holes (also called acoustic opening or sound capturing hole) of two microphones in the microphone array has a central role. Basically, a multi-input audio processing scheme can deduct the direction of sound source regarding to the axis according to the time difference between signals representing the same sound source and received by the two microphones: audio signals produced by a sound source located on one end of the axis correspond to the highest time difference (positive extreme value) while those produced by a sound source located on the other end of the axis correspond to the lowest time difference (negative extreme value); and audio signals produced by a sound source located on a normal plane of the axis correspond to a time difference equals 0. According to similar principle, an algorithm used in the multi-input audio processing scheme can distinguish sound sources from different angles regarding to the axis by evaluating the time differences ranging from the positive extreme value to the negative extreme value. When there are at least three microphones non-collinearly arranged in the microphone array, more than one of the axes like this can be used to locate the sound sources. The algorithm can then derive the specific spatial directional angle and distance of different sound source(s), and perform further processing on the audio signals, such as distinguish/separate audio signals from these sound source(s), enhancing audio signal from some sound source(s), suppressing or removing audio signal from some sound source(s), tracking audio signal from a specific sound source, etc.

In the case where the microphone array includes only two microphones, a multi-input audio processing scheme based on the time difference can accurately distinguish sound sources along the two directions (e.g., the front and back) of axis or in the vicinity of the axis. The feature of sound source(s) in such location is that the time difference correspond to audio signals produced by the sound source is close to the positive or negative extreme value. Therefore, in the technical solution of using the dual microphone array, if the approximate orientation of the target sound source can be determined in advance, the performance of the scheme can be greatly improved. In some embodiments, when an approximate direction of the target sound source(s) is known and the audio device may be adjusted or restrained so that the axis connecting the sound hole of the two microphones orient towards the target sound source(s) (e.g., a user may manually adjust the audio device or the mechanical design of the audio device may facilitate or lead to such orientation). Two embodiments consistent with FIG. 13 and FIG. 12 are described below to illustrate application scenarios where two-microphone array, manually adjusted by the user or guided by specific mechanical design to an appropriate orientation, can be deployed to achieve desired audio processing performance with minimum cost.

Figure 13:
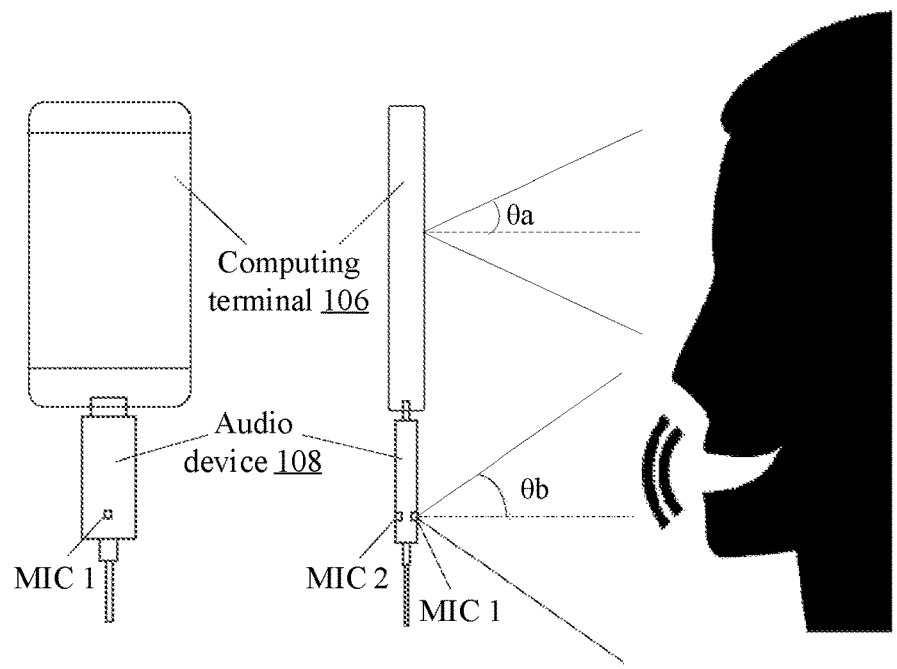
FIG. 13 illustrates another application scenario of an exemplary audio device consistent with the disclosed embodiments.

FIG. 13 illustrates one application scenario of an exemplary audio device consistent with the disclosed embodiments. The audio device shown in FIG. 13 include two microphones placed in a way that the axis connecting the sound holes of the two microphones is strictly perpendicular to the plane of its USB connector (e.g., similar to the audio device shown in FIG. 4-2). When a user connects the audio device 108 to a smart phone 106, due to the design of almost all the smart phones on the market where the plane of phone's USB connector port is always in parallel with the display screen (e.g., monitor 206) of the smart phone, it is mechanically guaranteed that the axis connecting the sound holes of the two microphones on the audio device is strictly in parallel with the normal axis of the display screen of the smart phone, with a distance of about 10 cm down (according to the usual orientation of the screen display content) from the screen's center. While using the smart phone, the user may have a great chance of viewing the display screen from a direction close to its normal axis, so that the eyes of the user are in a range of a cone corresponding to angle θa from the screen's normal axis. By consequence, the computing terminal can safely assume the location of the sound source (mouth of the user), with a distance about 10 cm down from the eyes, is located close to the axis connecting the sound holes of the two microphones on the audio device (e.g., the to-be-enhanced sound source is within a range of a cone corresponding to angle θb from the axis). The angles θa and θb are parameters that can be adjusted in the multi-input audio processing scheme based on practical applications. As explained in previous paragraph, such geometry placement of the microphone array provides an ideal scenario to perform the multi-input audio processing scheme such as beam forming. That is, with the to-be-enhanced sound source almost fixed in direction by the mechanical design of the disclosed embodiment, the computing terminal can easily perform an audio processing scheme to maintain the to-be-enhanced sound source while attenuating sounds from all other sources including ambient noise and the voice of human speakers other than the phone's user. This advantage is essential for a good performance of the audio device in scenarios like in-car driving (only the voice of the driver, user of the smart phone as navigation equipment, is to be enhanced) or face-to-face translation on noisy street (both the voice of the user using the smart phone as a translating device and that of its interlocutor, probably on the opposite direction to the smart phone, are to be enhanced).

Figure 12:
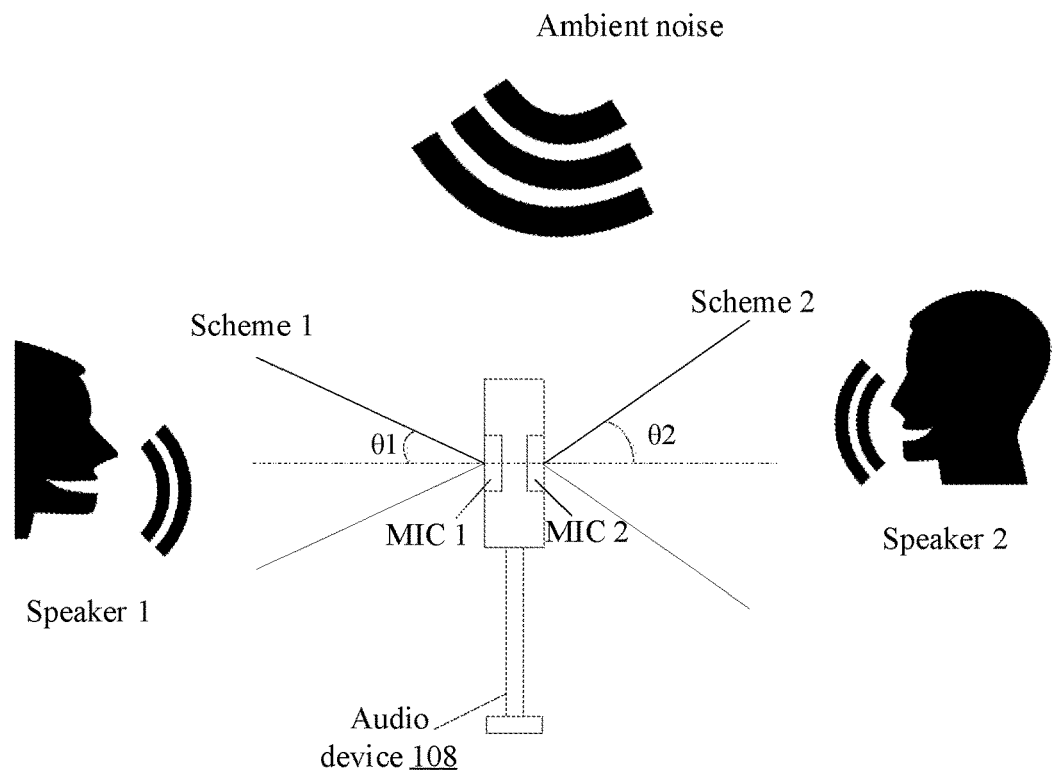
FIG. 12 illustrates an application scenario of an exemplary audio device consistent with the disclosed embodiments.

FIG. 12 illustrates another application scenario of an exemplary audio device consistent with the disclosed embodiments. When two human speakers make a conversation in a noisy ambience, they may place an audio device including two microphones as shown in FIG. 12 between them. The axis connecting the sound holes of the two microphones may be horizontal or slanted by any proper degrees by manual adjustment so that the axis point approximately towards the months of the two human speakers. The ambient noise may stem from any random direction surrounding the audio device. Such application scenario is particularly common in daily conversations. As explained in the previous paragraph, such geometry placement of the microphone array provides an ideal scenario to perform the multi-input audio processing scheme such as beam forming.

The disclosed audio processing system can be particularly useful in such application scenario where more than one main sound sources need to be recorded and/or recognized.

For example, the computing terminal, after reconstructing the audio signals from the two microphones, may execute two multi-input audio processing schemes simultaneously. The first multi-input audio processing scheme may be focused on enhancing voice signals from the first human speaker. That is, sounds within a range of a right circular cone having its apex at the sound hole of the first microphone and an angle between the axis and the generatrix of the cone being θ1 can be reserved and sounds outside such range are filtered out. The second multi-input audio processing scheme may be focused on enhancing voice signals from the second human speaker. Sounds within a range of a right circular cone having its apex at the sound hole of the second microphone and an angle between the axis and the generatrix of the cone being θ2 can be reserved and sounds outside such range are filtered out. The angles θ1 and θ2 are parameters that can be adjusted in the multi-input audio processing scheme based on practical applications. In some embodiments, beam forming techniques can be applied herein to selectively keep sounds within a certain range and filter out sounds outside the range. As the mouths of both human speakers are located at the axis that connects the two sound holes of the two microphones, the most significant time difference between the audio signals from the two microphones occurs to sounds travelled along the axis from the first human speaker and from the second human speaker (e.g., the most significant time difference obtained from the reconstructed signals is 18 ms). Sounds within the range of the right circular cone corresponding to the first human speaker have a first corresponding range of time differences (e.g., from 15 ms to 18 ms). Similarly, sounds within the range of the right circular cone corresponding to the second human speaker have a second corresponding range of time differences (e.g., from −15 ms to −18 ms). A similar noise cancellation or filtering process can be applied to the reconstructed audio signals to obtain a second enhanced signal corresponding to the second human speaker. In some embodiments, ambient noise (e.g., corresponding range of time differences around 0 ms) may be further reduced or cancelled. Such configuration can clearly separate sounds produced by the two human speakers, even when the two human speakers are interrupting each other's speech or talking at the same time. The computing terminal may perform voice recognition on the first enhanced signal and the second enhanced signal to determine a corresponding text or user command. This is particularly useful in application scenarios such as recording a conversation and machine translation.

In some embodiments, the computing terminal may be configured to perform the above described noise cancellation scheme for sounds from the front direction (e.g., enhancing signals within a range where the first microphone faces toward and reducing signals from other directions) based on the reconstructed audio signals to obtain an enhanced signal and perform voice recognition using the enhanced signal. In some other embodiments, the computing terminal may be configured to perform the above described noise cancellation scheme for sounds from the back direction (e.g., enhancing signals within a range where the second microphone faces toward and reducing signals from other directions) to obtain an enhanced signal and perform voice recognition using the enhanced signal. In some other embodiments, the computing terminal may be configured to respectively perform the above described noise cancellation scheme for sounds from the front direction and the back direction either simultaneously or alternatively based on application scenario or user settings, and perform voice recognition using the enhanced signal(s).

When the power-consuming processing is performed by the computing terminal as implemented in the present disclosure, comparing to a stand-alone audio device that uses its own computing resource which often only have the capability of executing only one multi-input audio processing scheme at one time, the computing power of the disclosed audio processing system (i.e., the combination of the disclosed accessory-level audio device and the computing terminal, usually equipped with a multi-core CPU) is much higher and allows parallel execution of a plurality of multi-input audio processing schemes at the same time (e.g., by running multiple threads in parallel). As explained in above example, such possibility to apply different multi-input audio processing schemes in parallel on one same multi-input audio data, can achieve very useful functionalities in various use scenarios such as: when receiving a conference call request in a public cafe, one would like to join the call without introducing all the ambient noise around; when making a one-on-one on-line meeting with a distant correspondent in an open-space office, one would like to lower its voice volume to minimize the impact on other co-workers, and to have, if possible, a meeting record in text file automatically generated; when two people have no choice but to have a serious discussion in a public place where ambient noise are inevitable, they may still expect to have a text memo on their conversation. In all above scenario, it is essential for the technical solution to obtain audio stream(s) containing the voice of each of the human speaker(s) where ambient noise and voice from all other human speakers are attenuated.

Figure 15:
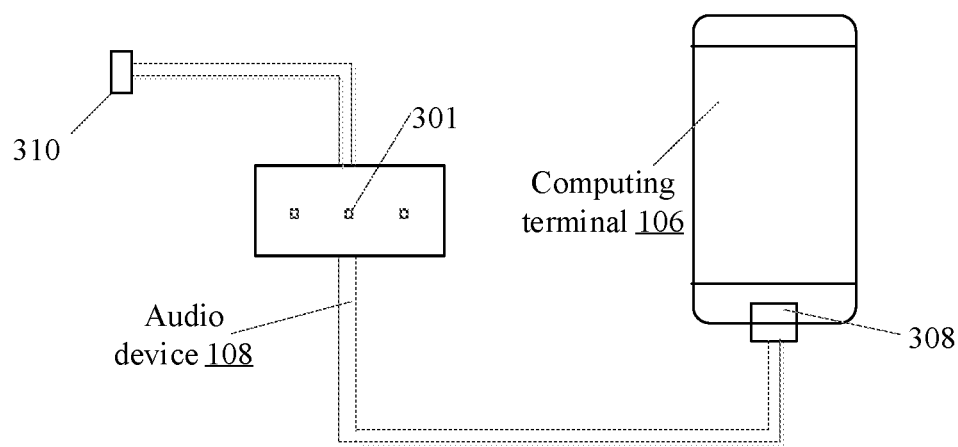
FIG. 15 illustrate a schematic view of an exemplary conference audio device consistent with the disclosed embodiments.

FIG. 15 illustrate a schematic view of an exemplary conference audio device consistent with the disclosed embodiments. As shown in FIG. 15, the audio device 108 may be connected to the computing terminal 106 for a conference call or other scenarios that require recording speeches or conversations of one or more human speakers (e.g., and converting audio records to texts). The multiple audio acquisition modules 301 (e.g., the microphone array component of the audio device) may be placed according to preset geometry pattern to facilitate multi-input audio processing scheme(s) to obtain distinct audio stream(s) with voice of each speaker(s) enhanced while noisy attenuated so as to archive a good voice recognition performance. In the meantime, the audio device may include an audio output port 309 connecting to embedded or external loudenspeaker(s) so the voice from distant participant(s), if any, could be heard by local human speakers. Comparing to stand-alone conference call devices that have high costs and bulky structures, a user can just connect the disclosed audio device 108 to the computing terminal 106 and achieve similar functionalities.

The present disclosure provides an audio processing method based on the audio device. FIG. 5 illustrates a flow chart of an exemplary audio processing method consistent with the disclosed embodiments. The method may be implemented by one or more of the audio device 300, the computing terminal 106 (e.g., by executing an installed software application compatible with the audio device 300), and the server 104. The software application may be developed by the manufacturer of the audio device. Alternatively, the manufacturer of the audio device may provide SDK library for third-party developers to embed functionalities of the audio device in third-party applications related to voice recognition. As shown in FIG. 5, the method may include the following steps.

An audio device is connected to a computing terminal (S502). The audio device (e.g., audio device 300) is integrated with at least two microphones. The audio device is configured to, when one end of the audio device is connected to the computing terminal, deliver audio signals collected by the at least two microphones to the computing terminal.

When the audio device is connected, the application compatible with the audio device may activate a voice control mode of the computing terminal. That is, voice instructions from the user are continuously monitored and analyzed by the application, based on audio signals sent from the audio device. In some embodiments, the application may be launched at the time that the audio device is connected. Alternatively, a monitoring process of the application may periodically detect whether the audio device is connected. Further, in some embodiments, after the audio device is connected to the computing terminal, the application may run in background of the computing terminal and be called into foreground when an incoming notification needs to be reported and/or when a wake-up word is detected and confirmed.

Audio signals collected by the at least two microphones of the audio device are obtained (e.g., synchronously sampled by a microcontroller of the audio device) (S504). In some embodiments, the first audio signal (i.e., audio signal collected by the first microphone) and the second audio signal (i.e., audio signal collected by the second microphone) are collected at the same time and respectively reflect sounds in their surrounding area during a same time period. Further, the two audio signals may be collected in real time. In addition, each microphone of the audio device may continuously monitor surrounding sound. When an amplitude of a sound (collected by the first microphone and/or the second microphone) reaches a preset threshold, a beginning time is marked; when an amplitude of the sound is below the preset threshold for a preset period (e.g., 1 second), an ending time is marked. Data collected from the beginning time until the ending time by the first microphone is determined as the first audio signal, and data collected from the beginning time until the ending time by the second microphone is determined as the second audio signal. In some embodiments, a piece of audio signal corresponds to a phrase or a sentence spoke by the user. In some embodiments, a piece of audio signal corresponds to a time period having a predetermined duration.

In some embodiments, the audio device may perform some preprocessing techniques locally on the collected audio signals, such as phase one signal amplification, phase one noise cancellation, etc.

The audio device encodes the audio signals to generate one data stream (S506). For example, the audio signals from the at least two microphones are encoded using interleaved encoding scheme to generate the data stream. The data stream is configured to be used by the computing terminal in reconstructing the audio signals collected by the at least two microphones in a synchronous time frame. In other words, the computing terminal may decode the data stream and reconstruct the audio signals, and the encoding scheme enable the computing terminal to reconstruct the audio signals that reflect precise synchronous time sequence. For example, first datapoints collected by different microphones of the audio device at a same first sampling time can be precise aligned in the reconstructed signals. Second datapoints collected by different microphones of the audio device at a same second sampling time later than the first sampling time definitely occur in the reconstructed signals after the first datapoints with same intervals.

Further, the reconstructed audio signals may be processed by the computing terminal to perform a corresponding action. For example, the computing terminal may analyze/process the reconstructed audio signals (e.g., perform at least one multi-input audio processing scheme on the reconstructed signals) to obtain one or more enhanced voice signals, such as phase two signal amplification, phase two noise cancellation, etc. The computing terminal can further recognize a wake-up voice command or perform voice recognition on the enhanced signal, detect a user intention based on the enhanced signal, and perform an action based on a detection result. In other words, voice control of the computing terminal can be achieved by using the audio signals collected by the microphones integrated in the audio device and analyzed/processed by the computing terminal.

In some embodiments, the audio device may be connected with a power source. The audio device is configured to facilitate the power from the power source to be supplied to the computing terminal through the audio device. In addition, the power supply of the audio device itself is received and achieved by the power source as well. The power source may be an embedded component of the audio device or an external power source electrically connected to the audio device. In some embodiments, the audio device may determine that the power source is not connected to the audio device, and receive power supply from the computing terminal. That is, when the power source is unavailable, the audio device is charged and maintains its operation by using power from the computing terminal. In some embodiments, the audio device supports standard USB charging protocol to implement the above described charging schemes based on availability of power source. The audio device also supports standard USB data transfer protocol to transmit the data stream to computing terminal.

Figure 6:
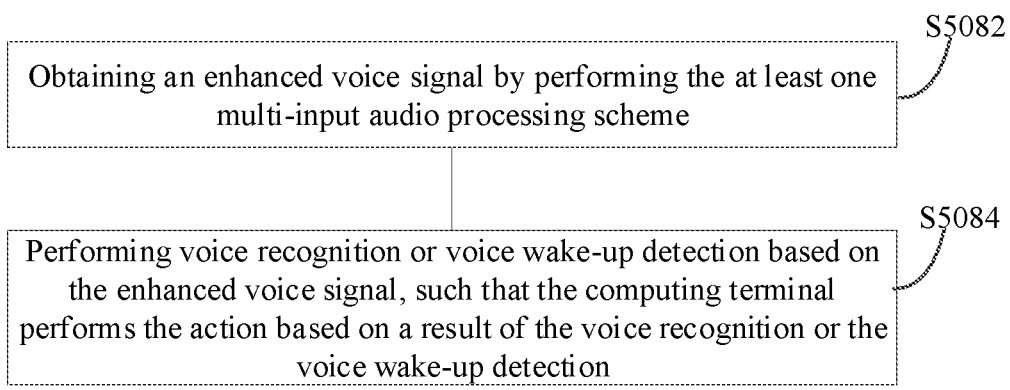
FIG. 6 illustrates a flow chart of an exemplary process for processing audio signals from the microphones consistent with the disclosed embodiments.

FIG. 6 illustrates a flow chart of an exemplary process for processing the audio signals from the microphones consistent with the disclosed embodiments. Specifically, after the computing terminal decodes the data stream and reconstructs the audio signals from the at least two microphones. Step S508 may further include: obtaining, by the computing terminal, an enhanced voice signal by performing a multi-input audio processing scheme (S5082). In some embodiments, multiple different multi-input audio processing schemes may be performed in parallel, and each multi-input audio processing scheme may produce one corresponding enhanced signal.

For example, the enhanced voice signal may be obtained by amplifying a differential signal, the differential signal being acquired by subtracting a second audio signal representing sound sources from ambient environment or unwanted human speaker from a first audio signal representing a desired sound source. The first audio signal may be a voice input collected by the first microphone located closer to a user of the computing terminal (e.g., at a device connection port of the audio device) and mainly includes information of human speech; and the second audio signal may be a background sound collected by the second microphone located further way from the user (e.g., at a power source connection port of the audio device). Accordingly, by subtracting the second signal from the first signal to acquire the differential signal, background noise can be reduced or removed, and by amplifying the differential signal, the voice input from the user can be further enhanced. Any proper signal processing techniques may be utilized on the first audio signal and the second audio signal to obtain the enhanced voice signal.

In one embodiment, it is predetermined that the first microphone is located closer to the user than the second microphone. In other words, audio signal from one specified microphone (e.g., a microphone of first audio acquisition module 302) of the audio device is considered as the voice input by default, and audio signal from another specified microphone (e.g., a microphone of second audio acquisition module 304) is considered as the background sound by default. In another embodiment, two audio signals may be preprocessed and/or compared to identify which one is the voice input and which one is the background sound. Specifically, in one example, an audio signal having a volume higher than a certain threshold is considered as the voice signal. In another example, an audio signal having a higher signal-to-noise ratio, or having higher information content/entropy is considered as the voice signal.

In some embodiments, the microphone(s) of the computing terminal may be used to collect surrounding sound and obtain the enhanced signals in accordance with audio signals collected by the microphones of the audio device. For example, audio signals collected by the microphones of the audio device may be considered as the voice input (e.g. used as the first audio signal and second signal); and the audio signal(s) collected by the microphone(s) of the computing terminal may be considered as the background sound (e.g., used as the third audio signal, etc.). Accordingly, a differential amplifier may be applied to obtain the enhanced voice signals based on inputs from the microphone of the computing terminal and the microphones of the audio device.

Step S508 may further include: performing voice recognition or voice wake-up detection based on the enhanced voice signal, such that the computing terminal performs the action based on a result of the voice recognition or the voice wake-up detection (S5084). Specifically, a variety of actions can be performed by the computing terminal depending on content of the enhanced voice signal, previous actions performed on the computing terminal, and/or current state of the computing terminal. For example, when the computing terminal is at an idle state, it can be determined whether the enhanced voice signal includes a voice wake-up word; and when the computing terminal is expecting a user input (e.g., after the computing terminal is woke up by the voice wake-up word, after the computing terminal converts an incoming message to an audio message and plays the audio message, or any other situations that requires user input), voice recognition may be performed on the enhanced voice signal to obtain a corresponding text. The voice recognition may be performed by the computing terminal offline, or performed in cooperation with a cloud server. In addition, a result of the voice recognition may be further used for voice editing, user intent identification, and/or other voice control operations on the computing terminal.

In some embodiments, the disclosed method may further include connecting the audio device to a power source, and charging the computing terminal through the audio device with power provided by the power source. That is, the audio device is configured to, when one end is connected to the computing terminal and another end is connected to a power source, deliver charging power/current from the power source to the computing terminal.

It should be noted that, in some embodiments, one end of the audio device 300 is not required to be connected to the power source 110 for implementing the audio processing method. As long as the audio device 300 is connected to the computing terminal 106, audio signals can be collected and transmitted to the computing terminal 106 for further processing, with power provided by either the power source 110 or the computing terminal 106.

Figure 7:
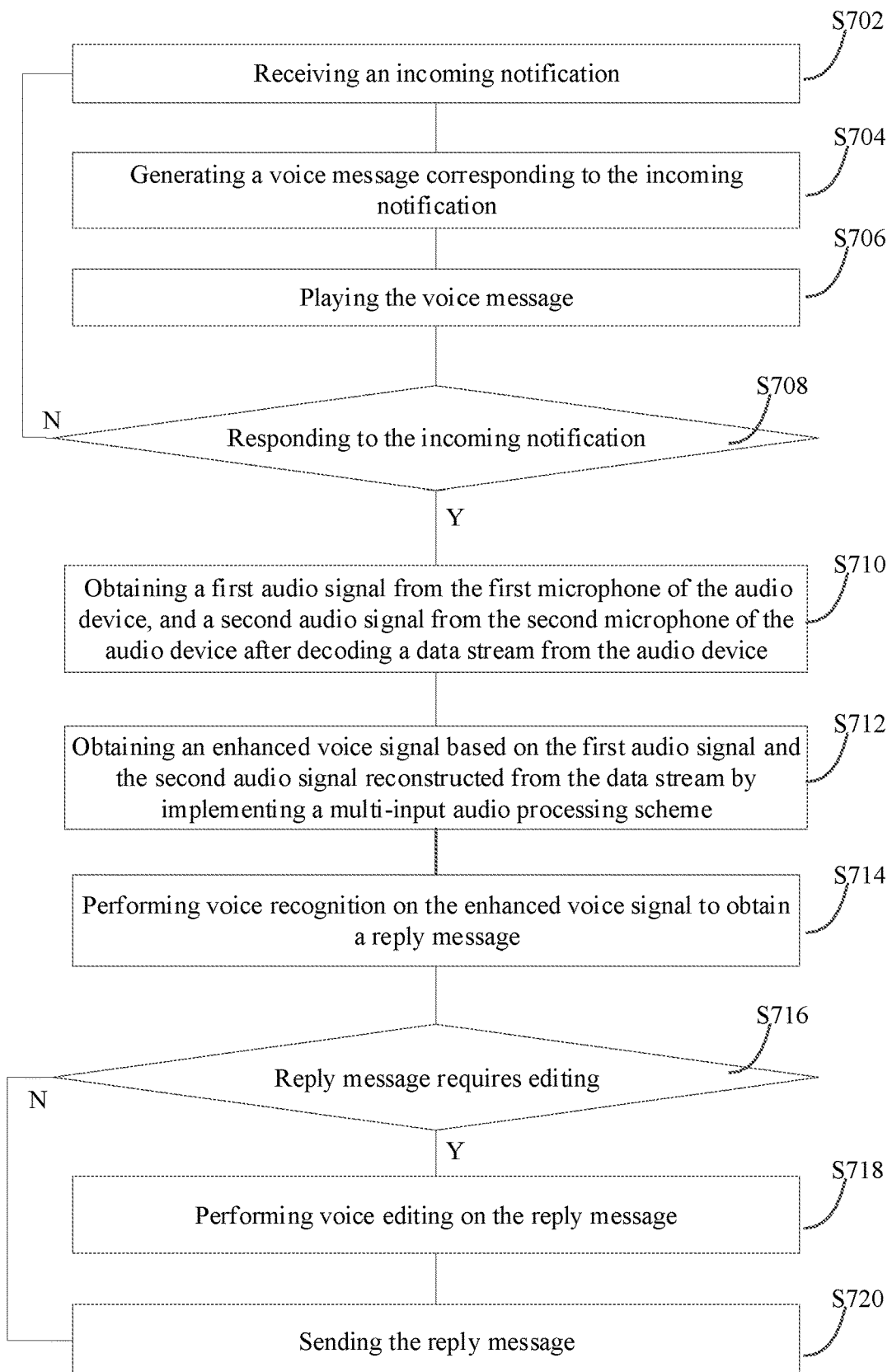
FIG. 7 illustrates a flow chart of another exemplary audio processing method consistent with the disclosed embodiments.

FIG. 7 illustrates a flow chart of another exemplary audio processing method consistent with the disclosed embodiments. The audio processing method as shown in FIG. 7 describes a typical implementation scenario of the disclosed audio device and audio processing method. This scenario is triggered when the computing terminal receives an incoming notification (S702).

Specifically, the incoming notification may be a push message in a notification bar of the computing terminal, or a message received by a specific app installed on the computing terminal. The push message may be a SMS message, an email message, an instant message, a newsfeed from a SNS App, etc. The incoming notification may be configured to present an update information related to an app and solicit launching the app to perform further actions regarding the update information. In some embodiments, a user may preselect, in the app compatible with the audio device, one or more apps that he/she would like to get voice updates. For example, the user may select to receive voice updates of a messaging app, a weather app, and a SNS app, and ignore notifications from other apps such as gaming apps, news apps, etc. Accordingly, the disclosed method may further include, determining whether the incoming notification corresponds to one of the preselected app or belongs to one of preselected types of apps; if the incoming notification corresponds to one of the preselected apps, performing step S704; and if not, standing by for next incoming notification or a voice wake-up word.

The computing terminal may generate a voice message corresponding to the received incoming notification (S704). Specifically, the computing terminal may identify basic information of the incoming notification, such as a corresponding app name, a sender name, and so on. When the incoming notification includes a text, the computing terminal may convert the text to speech signal; when the incoming notification includes audio data, the audio data may be directly used for composing the voice message. A voice message may be composed by including at least one of: the basic information of the incoming notification, content of the incoming notification, or a message asking the user whether to reply to the message. For example, the voice message may be "Mary posted a photo on Instagram with title: amazing sunset," or "you received a Facebook message from John saying: how are you, do you want to reply." Further, text-to-speech API on the computing terminal may be utilized for synthesizing the voice message based on the incoming notification.

Further, the computing terminal may play the voice message (S706). The voice message may be played by a built-in speaker of the computing terminal, or an external speaker/headphone connected to the computing terminal (e.g., Bluetooth speaker).

The computing terminal obtains user decision on whether to respond to the incoming notification (S708). In one embodiment, a question on whether to respond to the incoming notification may be included in the voice message, and subsequent audio signals may be collected and analyzed to determine whether the user selects to reply or not (e.g., by performing steps S502-S508) or determine content of the reply message (e.g., by performing steps S502-S508). In another embodiment, the voice message may not include the question, and the computing terminal obtains the user decision and/or reply message by directly analyzing the subsequent audio signals. When the user selects to respond to the incoming notification (e.g., when an enhanced voice signal obtained from the subsequent audio signals is recognized to be "yes" or "reply", or when the subsequent audio signals is received within 5 seconds after the computing terminal finishes playing the voice message), the process moves to Step S710. When the user selects to not to respond to the incoming notification (e.g., when an enhanced voice signal obtained from the subsequent audio signal is recognized to be "no" or when no audio signals are detected after the voice message is played), the process moves to Step S702. In some embodiments, the computing terminal may synthesize and play another voice message confirming the determination of user decision, such as "ok, please speak the reply message," or "ok, the message is not replied." Further, when the user confirms to respond to the incoming notification, the computing terminal may launch a message reply interface (e.g., a text inputting mode) in the corresponding application.

After the user selects to respond to the incoming notification, a first audio signal from the first microphone of the audio device and a second audio signal from the second microphone of the audio device are obtained (S710). Step S710 may be performed in a similar manner as Step S504. Further, an enhanced voice signal based on the first audio signal and the second audio signal are obtained (S712). Step S712 may be performed in a similar manner as Step S5082.

Voice recognition may be performed on the enhanced voice signal to obtain a reply message (S714). The voice recognition may be performed locally on the computing terminal, or remotely on a cloud server. Any proper voice recognition techniques may be utilized for detecting a text corresponding to the enhanced voice signal.

Further, the computing terminal may request the user to determine whether the recognized reply message requires editing (S716). For example, the computing terminal may convert the recognized text of the reply message to speech signal, and play the speech signal to request user confirmation. For example, the speech signal may be "you said 'be there in 10 minutes', is it correct," or "you said 'be there in 10 minutes', do you want to: edit message or send message." Audio signals collected after the speech signal/voice message is played may be obtained and analyzed (e.g., by performing steps S502-S508) to determine the user's selection about the reply message. When the computing terminal determines that the reply message requires editing (e.g., when the user replies "not correct" or "edit message"), the process goes to Step S718. When the computing terminal determines that the reply message is ready to send (e.g., when the user replies "correct" or "send message"), the process goes to step S720.

The computing terminal may perform voice editing on the recognized reply message (S718). Specifically, audio signals collected after the computing terminal confirms the user's intention for voice editing can be obtained and analyzed (e.g., by performing steps S502-S508) to determine voice editing instructions. The voice editing instructions may include: using voice to add text, delete text, or amend/replace text. In this way, the user can perform hands-free editing on the reply message by voice control. The reply message can be updated based on the voice editing instructions. When the user confirms to send the recognized reply message, the computing terminal can send the reply message (S720), completing the process of handling the incoming notification by voice control.

In various embodiments, besides reporting incoming information (e.g., step S704), voice synthesis (e.g., text-tospeech conversion) can be implemented whenever a user selection/decision is requested, such as determining whether to respond (e.g., step S708), confirming a result of voice recognition (e.g., step S716). Further, text used for voice synthesis may also be displayed on the computing terminal while the computing terminal plays the synthesized sound, depending on usage scenario and user preference.

Figure 8:
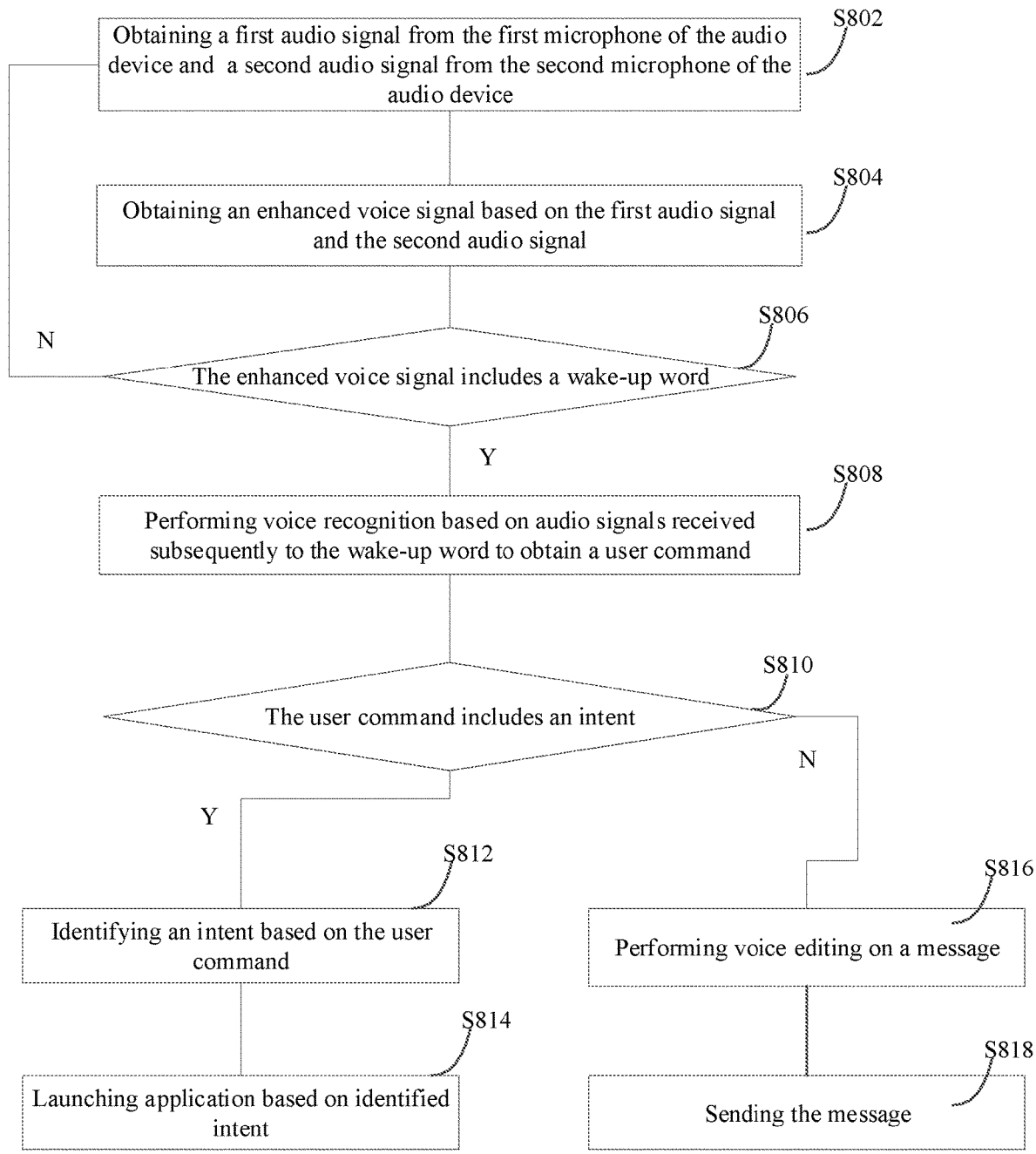
FIG. 8 illustrates a flow chart of another exemplary audio processing method consistent with the disclosed embodiments.

FIG. 8 illustrates a flow chart of another exemplary audio processing method consistent with the disclosed embodiments. The audio processing method as shown in FIG. 8 describes another typical implementation scenario of the disclosed audio device and audio processing method.

After the disclosed audio device is connected to a computing terminal, a first audio signal from the first microphone of the audio device and a second audio signal from the second microphone of the audio device are obtained (S802). Specifically, step S802 may be performed when the computing terminal is at an idle state and/or when the computing terminal is not expecting a user response based on a previous voice control action. Step S802 may be performed in a similar manner as Step S504. Further, an enhanced voice signal based on the first audio signal and the second audio signal are obtained (S804). Step S804 may be performed in a similar manner as Step S5082.

The computing terminal may detect whether the enhanced voice signal includes a voice wake-up word (S806). If the enhanced voice signal includes a wake-up word, the process moves to step S808, if not, the process moves to step S802.

The wake-up word may be preconfigured and recorded in the first app on the computing terminal. For example, the wake-up word may be any phrase of user choice, such as "hello KIKA," or "ok KIKA." In some embodiments, multiple wake-up words may be configured, and when any of the multiple wake-up word is detected, the computing terminal may respond accordingly. Further, the multiple wake-up words may trigger the computing terminal to make a same action or different actions based on preset configurations. For example, "hello KIKA," or "ok KIKA" may both trigger the computing terminal to expect a next operation instruction based on subsequent audio signals; and "ok phone dialer" may trigger the computing terminal to launch a phone dialing interface and to expect a contact name or phone number based on subsequent audio signals.

The computing terminal may request the user to read the wake-up word several times and record the voice inputs as reference signals (e.g. training data) when setting up the wake-up word. After the wake-up word is configured, a first training model for wake-up word detection and a second training model for wake-up word confirmation may be obtained based on features extracted from the reference signal and features of the voice wake-up word. The extracted features may be auditory based (Mel-Frequency Cepstral coefficients, perceptual linear prediction, etc.) and/or articulatory based features. The training models may be established based on an artificial neural network. Accordingly, the computing terminal can determine whether the enhanced voice signal include a wake-up word based on the training models.

If the enhanced voice signal includes the wake-up word, the computing terminal may bring the app compatible with the audio device to foreground, and/or play a specific sound to confirm that the wake-up word is successfully identified and subsequent voice inputs from the user is expected.

Further, voice recognition may be performed based on audio signals received subsequently to the wake-up word to obtain a user command (S808). Specifically, signals collected after the wake-up word may be obtained and analyzed (e.g., by performing steps S502-S508) to determine a user command accordingly. In other words, after the user speaks the wake-up word and successfully wakes up the computing terminal, a subsequent voice input reflects a desired operation to be performed on the computing terminal.

The computing terminal determines whether the user command includes an intent (S810). If the user command includes an intent, the process goes to Step S812, if not, the process goes to Step S816. Specifically, the user command may be a voice command corresponding to an operation operable by the foreground app (i.e., the user command does not include an intent), such as composing a message, making a phone call, etc. Alternatively, the user command may be a voice command for launching a specific app other than the foreground app, i.e., the user command includes an intent. In other words, an intent may allow the computing terminal to start an activity in another app by describing an action the user would like to perform (such as "play music," "view a map," or "take a picture"). In some embodiments, the intent may not specify the app name to start, but instead specifies an action and provides some data about which app to perform the action.

The user command may be analyzed to determine whether an intent is included. Specifically, operations that the foreground app is capable of performing are compared with the user command to determine whether there is an operation matching the user command. If a matching operation is found, the process goes to step S816, and if not, the process goes to step S812.

When it is determined that the user command includes an intent, the computing terminal may further identify the intent according to the user command (S812). Specifically, natural language processing techniques may be utilized to identify a user intent contained in the user command. The user intent may include launching an identified app on the computing terminal. The identified app is different from the foreground app triggered by the wake-up word. In some embodiments, the user intent may further include a specific activity/operation to be performed in the identified app.

An app based on the identified intent is launched (S814). In some embodiments, the computing terminal may further perform an operation/activity in the launched app based on the identified intent.

When it is determined that the user command does not include an intent, the computing terminal may further perform an operation in the foreground app according to the user command (S816). For example, the operation specified in the user command is to compose and send a message. Accordingly, voice editing may be performed to obtain the message. Step S816 may be performed in a similar manner as step S718. Further, voice control interactions may be implemented to select a contact for receiving the message. After the message is composed and confirmed by the user, the computing terminal may send the message to the selected contact (S818).

Figure 9:
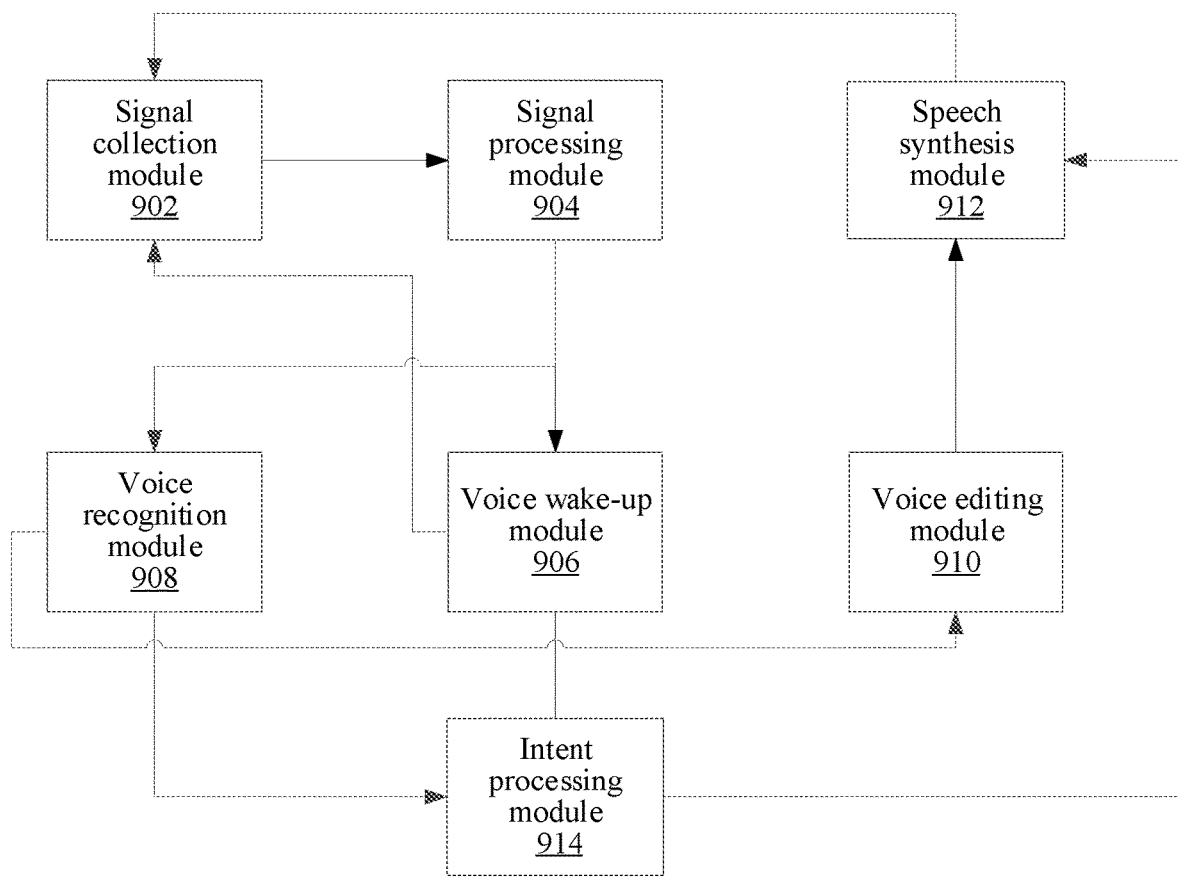
FIG. 9 illustrates a structural diagram of an exemplary audio processing system consistent with the disclosed embodiments.

FIG. 9 illustrates a structural diagram of an exemplary audio processing system consistent with the disclosed embodiments. As shown in FIG. 9, the system 900 may include: a signal collection module 902, a signal processing module 904, a voice wake-up module 906, a voice recognition module 908, a voice editing module 910, a speech synthesis module 912, and an intent processing module 914. Certain components may be omitted and other components may be included.

Specifically, the signal collection module 902 may configured to perform voice signal collection. In accordance with the disclosed audio device 300 which integrates at least two microphones at different locations, audio signals from the at least two microphones (e.g., a first audio signal and a second audio signal) are obtained from the audio device 300. In some embodiments, the computing terminal 106 may be set as a USB host, and the two microphones (e.g., the first audio acquisition module 302 and the second audio acquisition module 304) are set as USB peripheral devices. Audio signals collected by the microphones are transmitted to the computing terminal 106 in real time or not through standard USB data transmission protocol, achieving far-field voice signal collection.

The signal processing module 904 may be configured to perform far-field voice signal processing. After receiving audio signals collected by the microphones, the microcontroller 306 of the audio device 300 may encode the audio signals to a data stream to be transmitted to the computing terminal 106, and optionally implement preprocessing on the audio signal before encoding. The computing terminal 106 may decode the data stream, reconstruct the audio signals and perform multi-input audio processing scheme(s) to obtain an enhanced signal. In some embodiments, a differential amplifier may be used, a second audio signal is subtracted from a first audio signal, the resulting signal is further amplified, thereby obtaining clear and enhanced voice signal of the user.

The voice wake-up module 906 may be configured to detect whether a wake-up word is spoke by the user and perform corresponding action. Specifically, the enhanced voice signal from the signal processing module 904 may be further processed and analyzed, such as extracting acoustic features from the voice signal. The desired type of acoustic features may be distinctive and may reflect human auditory characteristics, such as MFCC (Mel-Frequency Cepstral Coefficient). The extracted acoustic features are used to calculate an acoustic score based on a first trained acoustic network model (e.g., artificial neural network model trained to classify a candidate wake-up word corresponding to the voice signal among multiple wake-up words) for wake-up word detection. If a path with the optimal score contains a wake-up word, it is determined that the wake-up word is detected. Further, the extracted acoustic features are used to calculate a final confirmation score based on a second trained acoustic network model (e.g., trained for validating a specific wake-up word) for wake-up word confirmation. If the final confirmation score is greater than or equal to the preset threshold, it is confirmed that the detected wake-up word is correct, and the computing terminal 106 is successfully waked-up based on the wake-up word. After the computing terminal 106 is waken, the signal collection module 902 may continue to collect audio signals which may contain further voice command from the user.

The voice recognition module 908 may be configured to analyze the enhanced voice signal and obtain text content included in the voice signal by performing voice recognition. In some embodiments, the computing terminal 106 may upload voice signals to a cloud server for recognizing corresponding text from the voice signals. By implementing this process, accuracy of voice recognition can be greatly improved. When the computing terminal 106 has poor connection to the cloud server, the computing terminal 106 may utilize an offline speech recognition decoder for rough speech recognition. A result from the voice recognition module 908 may be used for voice wake-up module 906, voice editing module 910, and/or intent processing module 914.

The voice editing module 910 may be configured to edit a text based on voice instructions from the user (e.g., voice instruction recognized by the voice recognition module 908). After the speech recognition process, some recognized text may need to be edited due to possible error of the speech recognition or voluntary editing need by the human speaker. The voice editing module 910 supports text editing by voice, including: identifying a to-be-edited location in the text and a variety of voice editing instructions (such as: deleting, adding, replacing, etc.), to achieve full voice-based text editing.

The speech synthesis module 912 may be configured to generate a voice message based on provided content. A common type of operation of using a mobile phone in a car driving environment is to check a message sent by friends or followers in a SNS application. In this scenario, the computing terminal 106 can provide voice synthesis services (e.g., text to voice service), and read the received text message (e.g., by reading a message pushed to the notification bar), convert the text message to an audio message and automatically play the audio message. Further, the computing terminal 106 allow the user to directly reply to the message through voice control. That is, voice inputs after playing the audio message can be converted into text for replying to the received message. Further, voice editing of the reply message is also supported, such that text messages that are satisfactory to the user can be replied.

The intent processing module 914 may be configured to perform intent recognition and launch an App based on recognized Intent. After obtaining a text from speech recognition, the computing terminal 106 further determines whether content of the text contains a specific Intent (user intent), for example, opening a navigation app, selecting a route in a navigation map, searching a destination in a map app, playing music and so on. The computing terminal 106 may utilize natural language processing technology to understand the content of the recognized text, identify a user intent contained in the text, and launch an application on the computing terminal 106 according to the specific Intent (such as navigation software, a media software, etc.) to achieve a function corresponding to the voice signal.

Specifically, the computing terminal 106 can be installed with a software application compatible with the disclosed audio device. The application may include program modules 902-914, and when being executed by a processor of the computing terminal 106, can implement functions of the modules 902-914. The application supports human-machine interactions completely by voice, and interacts with other apps (e.g., messaging app, social app, navigation app) and functions on the computing terminal for completing desired operations instructed by user's voice input.

In accordance with the various functionalities, the application compatible with the disclosed audio device may further maintain a database that stores information related to voice control, such as wake-up words for triggering user-initiated operation on the terminal, reporting templates for designating a format when reporting an incoming notification or when providing options for user selection/confirmation, voice command words for triggering specific preset operations (e.g., voice editing instructions), user preferences, training models for voice recognition, etc.

The present disclosure provides an audio system including the disclosed audio device 108 and computing terminal 106. The audio system may implement some or all the functionalities described in previous embodiments. The audio device includes at least two microphones configured to collect audio signals and a microcontroller. Each of the at least two microphones is respectively connected to the microcontroller. The microcontroller is configured to process the audio signals collected by the at least two microphones to generate one data stream; and when the audio device is connected to the computing terminal, send the data stream to the computing terminal. The computing terminal is configured to decode the data stream and reconstruct the audio signals, perform one or more multi-input audio processing schemes to obtain one or more enhanced audio signal, and perform an action based on a result of voice recognition of the enhanced audio signal.

By implementing the disclosed audio device and audio processing method, several advantages can be achieved. 1) The computing terminal can be completely controlled by voice commands while being charged, which frees user hands, even frees user eyes, thereby eliminating security risk caused by manually operating the computing terminal (e.g., while driving). 2) Hardware equipment cost for voice control is greatly reduced compared to big-screen console or external car assistant device in existing technologies. 3) Voice control of the computing terminal not only supports launching commonly-used apps based on Intent (such as navigation, music, etc.), but also supports voice-based social software chat.

As disclosed herein, the disclosed methods and mobile terminal may be accomplished by other means. The mobile terminals as depicted above in accordance with various embodiments are exemplary only. For example, the disclosed modules/units can be divided based on logic functions. In actual implementation, other dividing methods can be used. For instance, multiple modules or units can be combined or integrated into another system, or some characteristics can be omitted or not executed, etc.

When the integrated modules/units as disclosed above are implemented in the form of software functional unit(s) and sold or used as an independent product, the integrated units can be stored in a computer readable storage medium. Therefore, the whole or part of the essential technical scheme of the present disclosure can be reflected in the form of software product(s). The computer software product(s) can be stored in a storage medium, which can include a plurality of instructions to enable a computing device (e.g., a mobile terminal, a personal computer, a server, a network device, etc.) to execute all or part of the steps as disclosed in accordance with various embodiments of the present disclosure. The storage medium can include various media for storing programming codes including, for example, U-disk, portable hard disk, ROM, RAM, magnetic disk, optical disk, etc.

The disclosed embodiments are examples only. One of ordinary skill in the art would appreciate that suitable software and/or hardware (e.g., a universal hardware platform) may be included and used to perform the disclosed methods. For example, the disclosed embodiments can be implemented by hardware only, which alternatively can be implemented by software only or a combination of hardware and software. The software can be stored in a storage medium. The software can include suitable commands to enable any client device (e.g., including a digital camera, a smart terminal, a server, or a network device, etc.) to implement the disclosed embodiments.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. An audio device, comprising:
at least two microphones configured to collect audio signals;
a microcontroller connected to the at least two microphones; and
a plurality of sampling ports each corresponding and connected to one of the at least two microphones,
wherein the microcontroller is configured to:
sample the audio signals collected by the at least two microphones at the plurality of sampling ports in parallel;
encode, using an interleaved encoding scheme, the audio signals sampled at the plurality of sampling ports to generate one data stream, the plurality of sampling ports being triggered by a same clock signal to ensure an accuracy of alignments of decoded audio signals based on the data stream in a range of a microsecond order; and
in response to the audio device being connected to a computing terminal, send the data stream to the computing terminal, the data stream being further processed by the computing terminal.

2. The audio device of claim 1, further comprising:
a device connector port compatible with the computing terminal,
wherein:
the microcontroller is connected to the device connector port, and
the microcontroller is configured to send the data stream to the computing terminal through the device connector port.

3. The audio device of claim 2, further comprising:
a power source connector port configured to provide an interface between the audio device and a power source,
wherein:
the microcontroller is configured to detect whether the power source is connected, and in response to determining that the power source is connected, the audio device is configured to enable a charging current from the power source received through the power source connector port to be delivered to the computing terminal through the device connector port; and
the power source is a component of the audio device or an external power source electrically connected to the audio device.

4. The audio device of claim 3, wherein:
in response to the audio device being connected to the power source through the power source connector port, power of the at least two microphones and the microcontroller is provided by the power source;
in response to the audio device being connected to the computing terminal and disconnected from the power source, the power of the at least two microphones and the microcontroller is provided by the computing terminal.

5. The audio device of claim 4, further comprising:
an indicator light configured to indicate a current state of the audio device, and
the current state of the audio device is selected from at least one of: being powered by the computing terminal, being powered by the power source, or collecting the audio signals.

6. The audio device of claim 3, wherein:
the device connector port is disposed at a first end of the audio device, and the power source connector port is disposed at a second end of the audio device;
the at least two microphones comprise at least one first microphone and at least one second microphone;

the at least one first microphone is located at the first end of the audio device that houses the device connector port; and the at least one second microphone is located at the second end of the audio device that houses the power source connector port.

7. The audio device of claim 1, wherein:

the at least two microphones comprise at least one first microphone and at least one second microphone;

the at least one first microphone and the at least one second microphone are located at a first end of the audio device; and the at least one second microphone is located at a same surface or an opposite surface to the at least one first microphone.

8. The audio device of claim 1, wherein the microcontroller is further configured to:

before generating the data stream, perform a signal pre-processing scheme on the audio signals collected by the at least two microphones to produce preprocessed signals; and encode the preprocessed signals into the one data stream.

9. The audio device of claim 1, wherein:

the microcontroller is configured to encode the audio signals collected by the at least two microphones of the audio device in the data stream and send the data stream to the computing terminal using a wired or wireless non real-time communication protocol, including universal serial bus (USB) data transfer protocol, Wi-Fi communication protocol, ad Bluetooth communication protocol.

10. The audio device of claim 1, wherein:

the audio device is a charger cable, a charger adapter, a phone holder, or a charging dock.

11. The audio device of claim 1, further comprising:

an audio output port compatible with an audio output device, wherein:
the microcontroller is connected to the audio output port, and
the microcontroller is configured to receive to-be-played audio data and send the to-be-played audio data to the audio output port device for playing on the audio output device.

12. The audio device of claim 1, wherein:

the at least two microphones include at least one first microphone and at least one second microphone;

the at least one first microphone is arranged near a desired sound source and configured to collect first audio signals;

the at least one second microphone is arranged away from the desired sound source and configured to collect second audio signals; and the computing terminal is configured to process the first audio signals in reference to the second audio signals to reduce noises in the first audio signals.

13. The audio device of claim 1, wherein the microcontroller is further configured to:

encode audio signals sampled from an $(i+1)^{th}$ microphone during m consecutive sampling periods immediately after encoding audio signals sampled from an $i^{th}$ microphone during m consecutive sampling periods; and encode audio signals sampled from a first microphone during m consecutive sampling periods immediately after encoding audio signals sampled from an $n^{th}$ microphone during m consecutive sampling periods, wherein:

n is a total number of the at least two microphones, the at least two microphones include the $i^{th}$ microphone and the $n^{th}$ microphone, i is an integer selected from 1 to n−1, and m is a positive integer.

14. An audio processing method, comprising:

connecting an audio device to a computing terminal, the audio device including at least two microphones and a plurality of sampling ports each corresponding and connected to one of the at least two microphones;

obtaining audio signals collected by the at least two microphones of the audio device;

sampling the audio signals collected by the at least two microphones at the plurality of sampling ports in parallel;

encoding, by the audio device, the audio signals sampled at the plurality of sampling ports using an interleaved encoding scheme to generate one data stream, the plurality of sampling ports being triggered by a same clock signal to ensure an accuracy of alignments of decoded audio signals based on the data stream in a range of a microsecond order; and sending the data stream to the computing terminal, the data stream being decoded and processed by the computing terminal to perform an action.

15. The method of claim 14, further comprising:

connecting the audio device with a power source;

supplying power from the power source to the computing terminal through the audio device; and receiving, by the audio device, power supply from the power source, wherein the power source is a component of the audio device or an external power source electrically connected to the audio device.

16. The method of claim 15, further comprising:

determining whether the audio device is connected to the power source;

in response to determining that the audio device is connected to the power source, providing, by the power source, power to the at least two microphones and the microcontroller; and in response to determining that the audio device is not connected to the power source, providing, by the computing terminal, the power to the at least two microphones and the microcontroller.

17. The method of claim 14, further comprising:

sending the data stream to the computing terminal using a wired or wireless non real-time communication protocol, including universal serial bus (USB) data transfer protocol, Wi-Fi communication protocol, and Bluetooth communication protocol.

18. The method of claim 14, wherein the interleaved encoding scheme comprises:

encoding audio signals sampled from an $(i+1)^{th}$ microphone during m consecutive sampling periods immediately after encoding audio signals sampled from an $i^{th}$ microphone during m consecutive sampling periods; and encoding audio signals sampled from a first microphone during m consecutive sampling periods immediately after encoding audio signals sampled from an $n^{th}$ microphone during m consecutive sampling periods, wherein:

n is a total number of the at least two microphones, the at least two microphones include the $i^{th}$ microphone and the $n^{th}$ microphone, i is an integer selected from 1 to n−1, and m is a positive integer.

19. The method of claim 18, further comprising:

compressing, using a compressing scheme, a plurality of consecutive data points into one data capsule, each of the plurality of data points including the audio signals sampled from one of the at least two microphones during one sampling period.

20. An audio system, comprising:

an audio device and a computing terminal, wherein:
 the audio device includes: at least two microphones configured to collect audio signals, a microcontroller connected to the at least two microphones, and a plurality of sampling ports each corresponding and connected to one of the at least two microphones;
 the microcontroller is configured to:
  sample the audio signals collected by the at least two microphones at the plurality of sampling ports in parallel;
  encode, using an interleaved encoding scheme, the audio signals sampled at the plurality of sampling ports to generate one data stream, the plurality of sampling ports being triggered by a same clock signal to ensure an accuracy of alignments of decoded audio signals based on the data stream in a range of a microsecond order; and
  in response to the audio device being connected to the computing terminal, send, in real-time or non real-time communication, the data stream to the computing terminal through a wired or wireless connection; and the computing terminal is configured to:
 decode the data stream and reconstruct the audio signals sampled at the plurality of sampling ports, thereby ensuring the accuracy of the alignments of the decoded audio signals in a range of a microsecond order;
 perform one or more multi-input audio processing schemes to obtain one or more enhanced audio signals, each multi-input audio processing scheme corresponding to one of the one or more enhanced audio signals; and
 perform an action based on a result of at least one of the one or more enhanced audio signals.

* * * * *